(12) United States Patent
Gelman et al.

(10) Patent No.: US 12,199,854 B2
(45) Date of Patent: Jan. 14, 2025

(54) PATH SELECTION IN DATA COMMUNICATION NETWORKS

(71) Applicant: ECI Telecom Ltd., Petah Tikva (IL)

(72) Inventors: Efraim Gelman, Ramat Gan (IL); Ziv Shem-Tov, Ramat Hasharon (IL); Inbal Hecht, Petah Tikva (IL); Shirel Ezra, Ganei Tal (IL)

(73) Assignee: ECI Telecom Ltd., Petah Tikva (IL)

( * ) Notice: Subject to any disclaimer, the term of this patent is extended or adjusted under 35 U.S.C. 154(b) by 0 days.

(21) Appl. No.: 17/864,790

(22) Filed: Jul. 14, 2022

(65) Prior Publication Data

US 2024/0022498 A1 Jan. 18, 2024

(51) Int. Cl.
*H04L 45/122* (2022.01)
*H04L 45/00* (2022.01)

(52) U.S. Cl.
CPC ............ *H04L 45/122* (2013.01); *H04L 45/14* (2013.01)

(58) Field of Classification Search
CPC ..... H04L 45/12; H04L 45/121; H04L 45/122; H04L 45/126; H04L 45/14; H04L 45/16; H04L 45/17
See application file for complete search history.

(56) References Cited

U.S. PATENT DOCUMENTS

| | | | | |
|---|---|---|---|---|
| 8,233,397 B1* | 7/2012 | Bhandari | ................ | H04L 45/12 370/237 |
| 10,841,003 B1* | 11/2020 | Ezra | ........................ | H04L 45/02 |
| 10,885,118 B2* | 1/2021 | Fan | ...................... | G06F 16/9024 |
| 2012/0117269 A1* | 5/2012 | Zhang | ................. | H04J 14/0257 709/241 |
| 2012/0301143 A1* | 11/2012 | Shimizu | ............. | H04J 14/0271 398/49 |
| 2016/0377442 A1* | 12/2016 | Ye | ........................ | G06F 30/392 701/533 |

(Continued)

OTHER PUBLICATIONS

European Patent Office Communication Regarding Extended European Search Report in counterpart European Patent Application No. 23185425.8 mailed Nov. 9, 2023, 10 pages.

(Continued)

*Primary Examiner* — Chi H Pham
*Assistant Examiner* — Weibin Huang
(74) *Attorney, Agent, or Firm* — Finnegan, Henderson, Farabow, Garrett & Dunner LLP

(57) ABSTRACT

Systems and methods are disclosed for determining a more-efficient set of routes on a communications network, given an initial set of routes that satisfies a set of demands. Consistent with disclosed embodiments, the routes can be represented as network paths on a network graph that represents the communications network. In some embodiments, a set of irreducible paths can be generated from the original network paths. The communications network can then be updated to implement routes corresponding to the set of irreducible paths. In some embodiments, a bipartite graph can be generated from the original network paths and the irreducible paths. An updated set of paths can be generated by selecting ones of the original network paths or the irreducible paths. In some embodiments, auxiliary graph can be generated from the original network paths and the irreducible paths. An updated set of paths can be generated using the auxiliary graph.

23 Claims, 19 Drawing Sheets

(56) References Cited

U.S. PATENT DOCUMENTS

2016/0380873 A1* 12/2016 Kanonakis .............. H04Q 3/64
                                                    370/254
2020/0351900 A1* 11/2020 Zhang ................... H04W 4/029

OTHER PUBLICATIONS

Fleszar, K. et al., "New Algorithms for Maximum Disjoint Paths based on Tree-Likeness", Mathematical Programming, Ser. A, North-Holland, Amsterdam, Netherlands, vol. 171, No. 1, Nov. 14, 2017, pp. 433-461.

Yallouz, J. et al., "Minimum-Weight Link-Disjoint Node- "Somewhat Disjoint" Paths", IEEE/ACM Transactions on Networking, IEEE/ACM, New York, NY, United States, vol. 26, No. 3, Jun. 1, 2018, pp. 1110-1122.

\* cited by examiner

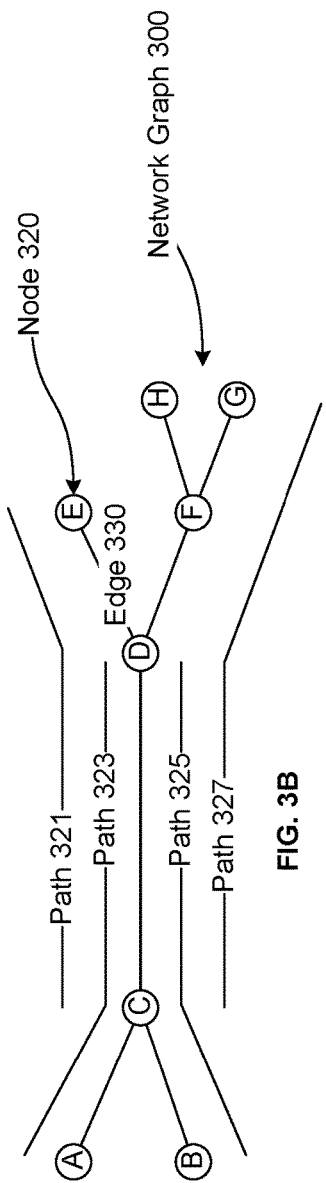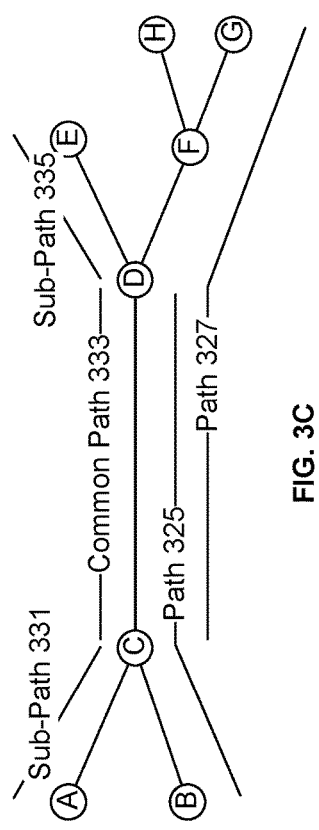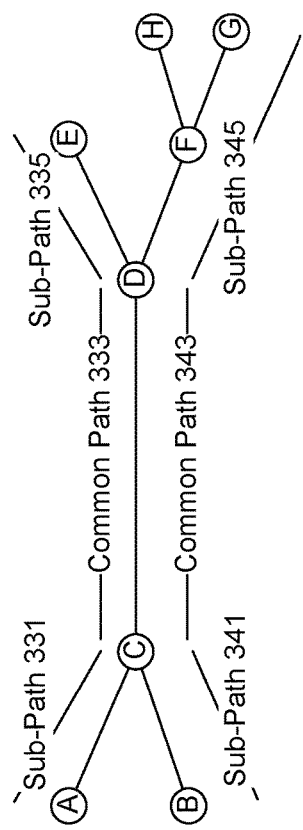
FIG. 3B
FIG. 3C
FIG. 3D

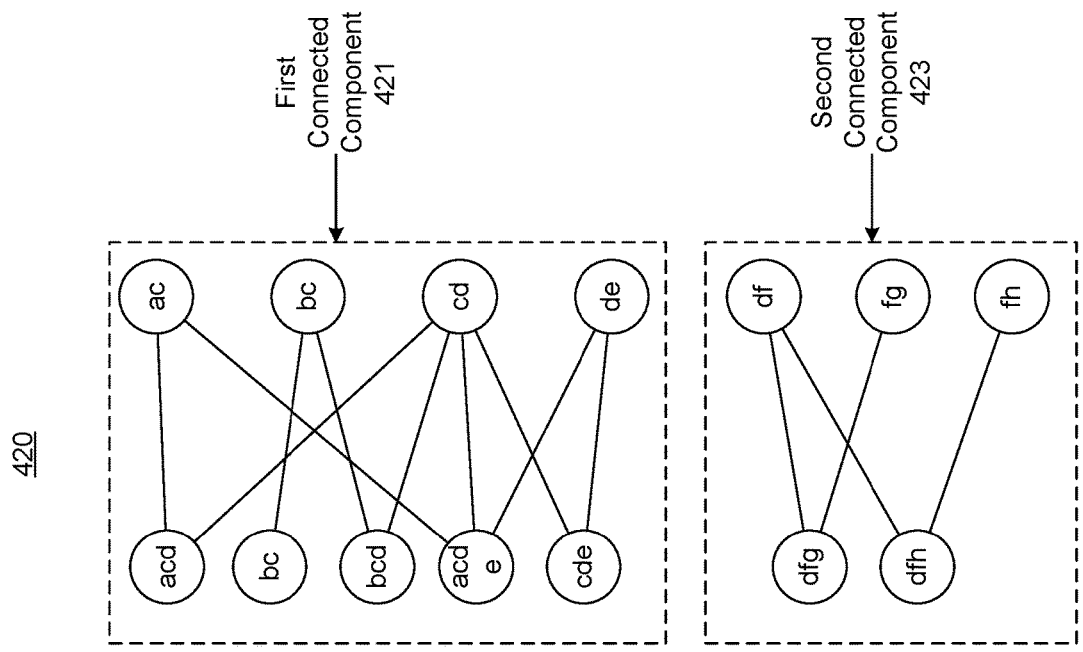
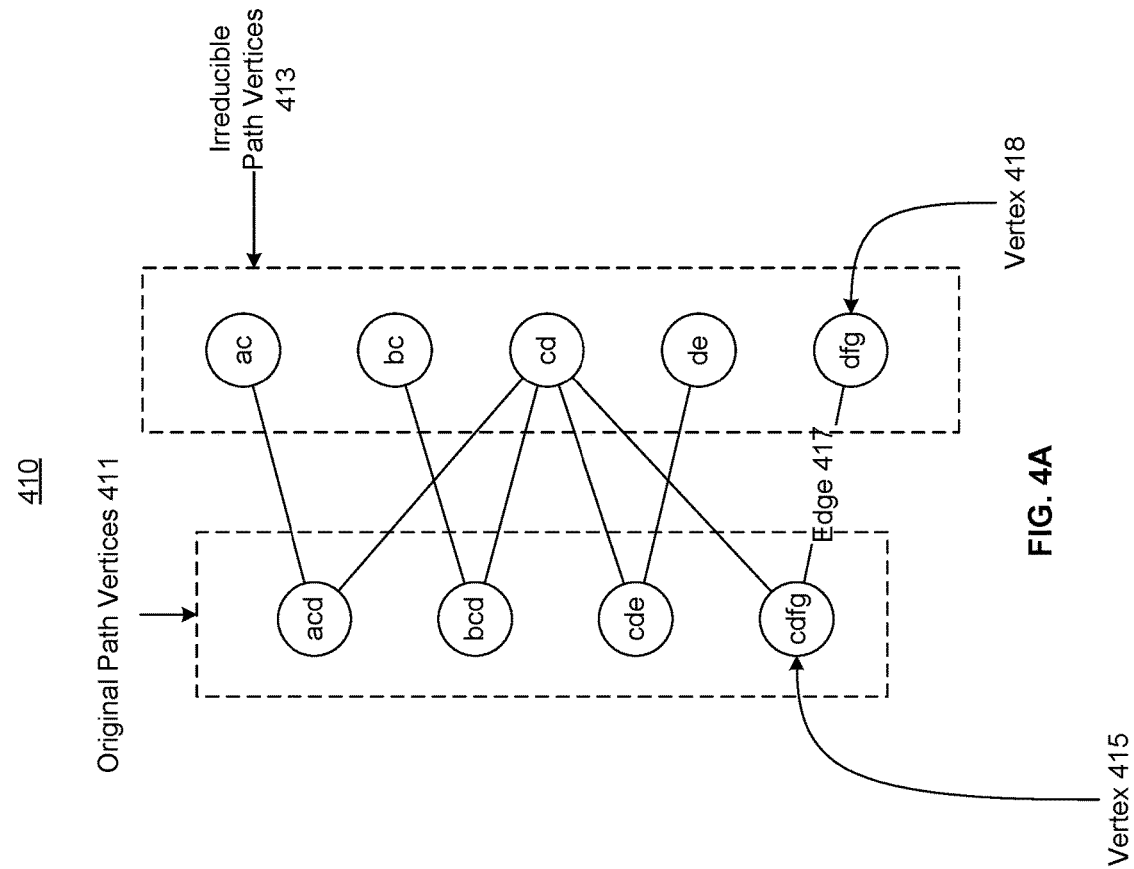
FIG. 4B
FIG. 4A

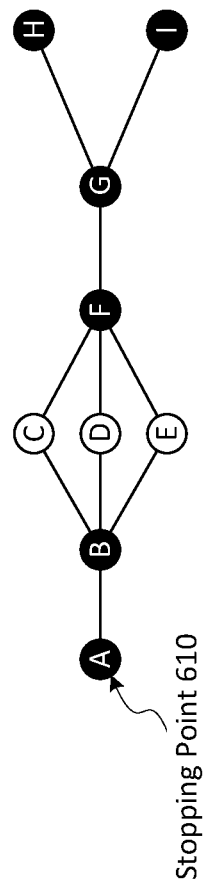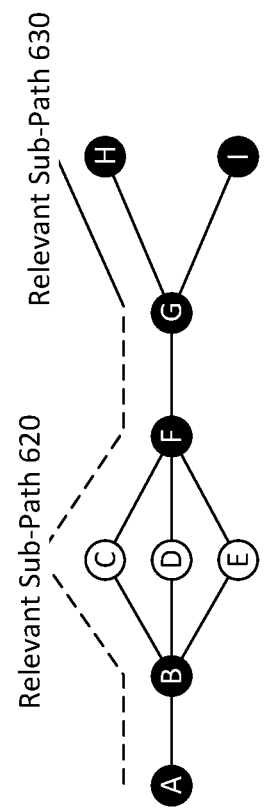

1000

```
Obtaining network graph and network paths representing routes on a
communication network 1010
            │
Generating irreducible paths on the graph based on the network paths 1020
            │
Generating a bipartite graph including first vertices corresponding to the
network paths and second vertices corresponding to the irreducible paths
1030
            │
Selecting a subset of the network paths and a subset of the irreducible paths
using the bipartite graph 1040
            │
Determining a graph weight for the subset of the network paths and an
irreducible weight for the subset of the irreducible paths 1050
            │
Comparing the graph weight and the irreducible weight 1060
            │
Including in an updated set of network paths either the network path subset
or the irreducible path subset 1070
```

FIG. 10

PATH SELECTION IN DATA COMMUNICATION NETWORKS

TECHNICAL FIELD

The present disclosure relates to the field of data communication networks and, more particularly, to systems and methods for routing in a data communication network.

BACKGROUND

Routes can be defined on a communications network for satisfying a set of demands. Implementation of each route can use resources of the communications network. Determining a more-efficient set of routes that remains capable of satisfying the demands can improve performance of the communications network. Fewer communications network resources can be used, or additional demands can be satisfied. Unfortunately, determining a more efficient set of routes is an NP hard problem.

SUMMARY

Systems and methods are disclosed for determining a more-efficient set of routes on a communications network, given an initial set of routes that satisfies a set of demands. Consistent with disclosed embodiments, the routes can be represented as network paths on a network graph that represents the communications network. In some embodiments, a set of irreducible paths can be generated from the original network paths. The communications network can then be updated to implement routes corresponding to the set of irreducible paths. In some embodiments, a bipartite graph can be generated from the original network paths and the irreducible paths. An updated set of paths can be generated by selecting ones of the original network paths or the irreducible paths. In some embodiments, auxiliary graph can be generated from the original network paths and the irreducible paths. An updated set of paths can be generated using the auxiliary graph.

The disclosed embodiments include a method for generating an updated set of routes on a communication network. The method can include obtaining network paths on a graph corresponding to the communication network, each network path representing a route on the communication network. The method can further include generating irreducible paths on the graph based on the network paths. The method can further include determining a first weight for a first subset of the network paths and a second weight for a corresponding second subset of the irreducible paths, wherein each irreducible path in the second subset corresponds to at least one graph path in the first subset. The method can further include comparing the first weight and the second weight. The method can further comprise including in an updated set of paths, based on the comparison of the first weight and the second weight, either the first subset or the second subset, the updated set of paths corresponding to the updated set of routes on the communication network.

In some embodiments, generating the irreducible paths can include identifying a first path of the network paths and a second path of the network paths, wherein the first path comprises a common path, and the second path comprise a concatenation of a differing path and the common path. Generating the irreducible paths can further comprise including in a set of paths the common path and the differing path.

In some embodiments, the second weight can be a function of irreducible paths included in the second subset.

In some embodiments, the second weight can be a function of endpoints of the irreducible paths included in the second subset.

In some embodiments, the method can further include generating a bipartite graph including first vertices corresponding to the network paths and second vertices corresponding to the irreducible paths. The method can further include selecting, prior to determining the first and second weights, the first and second subsets using the bipartite graph. In some embodiments, selecting the first and second subsets using the bipartite graph can include identifying a connected component in the bipartite graph, the connected component including ones of the first vertices corresponding to the first subset and ones of the second vertices corresponding to the second subset.

In some embodiments, the second subset can be included in the updated set of paths. The method can further include determining a third weight for a third subset of the irreducible paths based on the inclusion of the second subset in the updated set of paths.

The disclosed embodiments include a method for generating an updated set of routes on a communication network. The method can include obtaining network paths on a network graph corresponding to the communication network, each network path representing a route on the communication network. The method can further include generating irreducible paths on the network graph based on the network paths. The method can further include identifying stopping vertices using the irreducible paths. The method can further include generating an auxiliary graph, wherein vertices of the auxiliary graph correspond to the stopping vertices and auxiliary graph edges of the auxiliary graph correspond to sub-paths connecting the stopping vertices on the network graph. The method can further include determining auxiliary graph paths on the auxiliary graph, each of the network paths corresponding to one of the auxiliary graph paths. The method can further include determining updated network paths on the network graph, each of the updated network paths corresponding to an auxiliary graph edge included in one of the auxiliary graph paths, the updated graph paths corresponding to the updated set of routes on the communication network.

In some embodiments, generating the irreducible paths can include identifying a first path of the network paths and a second path of the network paths, wherein the first path comprises a common path, and the second path comprise a concatenation of a differing path and the common path. Generating the irreducible paths can further comprise including in a set of paths the common path and the differing path.

In some embodiments, the stopping vertices can include endpoints of the irreducible paths.

In some embodiments, generating the auxiliary graph can include generating a sub-auxiliary graph for each one of the network paths, and combining the sub-auxiliary graphs. In some embodiments, each vertex of the sub-auxiliary graph can correspond to one of the stopping vertices. Each edge of the sub-auxiliary graph can correspond to a sub-path between two stopping vertices, the sub-path on the one of the network paths, and can connect two vertices of the sub-auxiliary graph that correspond to the two stopping vertices.

In some embodiments, generating the auxiliary graph can include creating, for a pair of stopping vertices connected by a sub-path of one of the network paths, an edge connecting two auxiliary graph vertices, the two auxiliary graph vertices corresponding to the pair of stopping vertices.

In some embodiments, determining the auxiliary graph paths on the auxiliary graph can include determining candidate minimum-weight auxiliary graph paths based in part on edge weights associated with the auxiliary graph edges. Determining the auxiliary graph paths on the auxiliary graph can further include selecting one of the candidate minimum-weight auxiliary graph paths as one of the auxiliary graph paths. Determining the auxiliary graph paths on the auxiliary graph can further include updating the edge weights associated with auxiliary graph edges included in the selected one of the candidate minimum-weight auxiliary graph paths.

In some embodiments, the candidate minimum-weight auxiliary graph paths can be determined based in part on vertex weights associated with the auxiliary graph vertices. Determining the auxiliary graph paths on the auxiliary graph can further include updating the vertex weights associated with auxiliary graph vertices included in the selected one of the candidate minimum-weight auxiliary graph paths.

In some embodiments, the auxiliary graph paths can be determined using integer linear programming.

The disclosed embodiments include a method for generating an updated set of routes on a communication network. The method can include generating a bipartite graph. The bipartite graph can include first vertices corresponding to original paths on a network graph, each path representing a route on a communication network, second vertices corresponding to irreducible paths on the network graph, and edges, each edge connecting one of the first vertices with one of the second vertices. The method can further include identifying a connected component within the bipartite graph. The connected component can include a first subset of the first vertices and a second subset of the second vertices. The method can further include determining a first weight for the first subset and a second weight for the second subset. The method can further include comparing the first weight and the second weight. The method can further comprise including in an updated set of paths, based on the comparison of the first weight and the second weight, either the first subset or the second subset, the updated set of paths corresponding to the updated set of routes on the communication network.

In some embodiments, the method can further include generating the irreducible paths. The generation of the irreducible paths can include identifying a first path of the network paths and a second path of the network paths, wherein the first path comprises a common path, and the second path comprise a concatenation of a differing path and the common path; and including in a set of paths the common path and the differing path.

In some embodiments, the second weight can be a function of edges of the graph included in the second subset.

In some embodiments, the second weight can be a function of vertices of the graph included in the second subset.

The disclosed embodiments include a method of determining an updated set of routes. The method can include obtaining $(k_1 \cdot k_2 \cdot k_3)^l$ network paths on a network graph corresponding to the communication network. The network graph can include l layers and for i=1 to l each layer can include $(k_2 \cdot k_3)^{i-1}$ subnetworks. Each subnetwork can include an entry vertex, a second vertex, a third vertex, a fourth vertex set including $k_2$ fourth vertices, and a fifth vertex set including $k_2$ subsets of $k_3$ fifth vertices. Each vertex in the fifth vertex set for each subnetwork in the layer can be connected to the entry vertex in a subnetwork in the subsequent layer. For each subnetwork: $k_1$ sequences can connect the entry vertex and the second vertex; a single edge can connect the second vertex and the third vertex; the third vertex can be connected by a single edge to each of the $k_2$ fourth vertices; and each of the $k_2$ fourth vertices can be associated with one subset of the $k_2$ subsets, each of the $k_3$ fifth vertices in the one subset can be connected to the associated fourth vertex. Each vertex in the subnetwork can be included in at least one of the $(k_1 \cdot k_2 \cdot k_3)^l$ network paths. The method can further include generating a set of irreducible paths on the network graph can be based on the $(k_1 \cdot k_2 \cdot k_3)^l$ network paths. The method can further include providing, based on the set of irreducible paths, an updated set of network paths corresponding to an updated set of routes. The updated set of network paths can include $\Sigma_{i=1, \ldots, l}(k_2 \cdot k_3)^{i-1} \cdot (k_1 + 1 + k_2 \cdot (k_3 + 1))$ network paths or $\Sigma_{i=1, \ldots, l} i(k_2 \cdot k_3)^{i-1} \cdot (k_1 + k_2 \cdot k_3)$ network paths.

The foregoing general description and the following detailed description are exemplary and explanatory only and are not restrictive of the claims.

BRIEF DESCRIPTION OF THE DRAWINGS

The accompanying drawings, which are incorporated in and constitute part of this disclosure, together with the description, illustrate and serve to explain the principles of various example embodiments.

FIGS. 3A to 3D depict generation of a set of irreducible paths from a set of original network paths on a network graph 300, consistent with disclosed embodiments.

FIGS. 4A and 4B depict bipartite graphs constructed using original network paths and irreducible paths, consistent with disclosed embodiments.

FIGS. 6A and 6B depict stopping points and a relevant sub-path on the network of FIGS. 5A to 5D, consistent with disclosed embodiments.

FIG. 10 depicts an exemplary method for updating routes in a communication network, consistent with disclosed embodiments.

DETAILED DESCRIPTION

Figure 1:
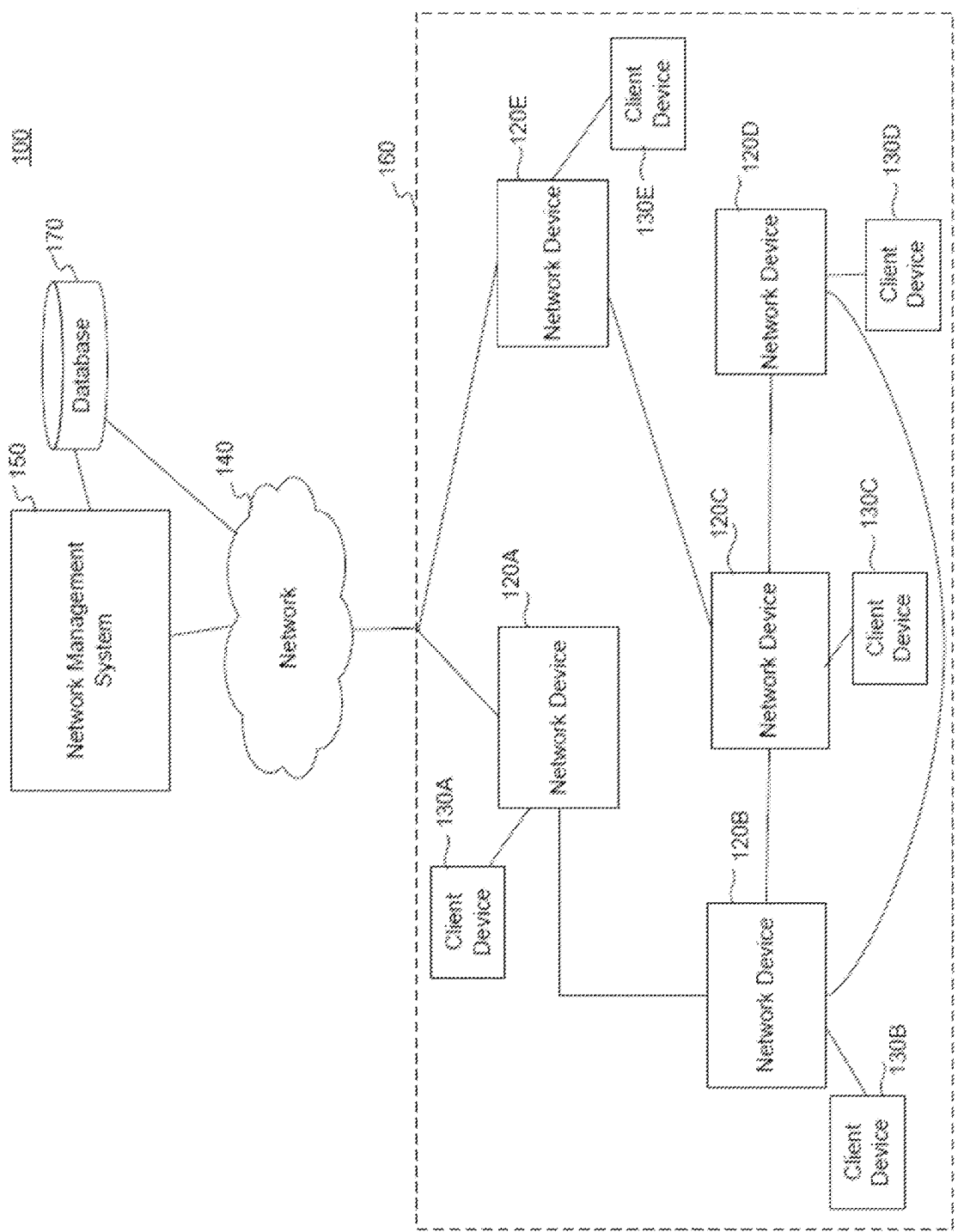
FIG. 1 depicts an exemplary data communication network in which various implementations as described herein may be practiced.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

A communication network can include network nodes (e.g., clients, servers, microservices, virtual machines, serverless code instances, IoT devices, etc.) configured to communicate with one another using communication links. The disclosed embodiments are not limited to any particular communication link implementation or physical medium. The communication links can include wired or wireless communication links. Wired communication links can include optical links, electrical communication links, or other suitable links. Wireless communication links can include microwave, radio wave, optical links, or other suitable wireless links. Communications between network nodes can be implemented using communications protocols. The disclosed embodiments are not limited to any particular communication protocol. Communication protocols can include cellular communication protocols (e.g., 3G, 4G, 5G, or the like), IEEE 802 or IEEE 802-based protocols (e.g., Ethernet, WiFi, Zigbee or the like), Digital subscriber line (DSL), Plain old telephone service (POTS), or other suitable protocols.

A communications network can be configured to satisfy demands. As used herein, a demand can be a request to communicate (or establish a communication channel, or the like) between a source node and a target node in the network. In some embodiments, a demand can specify a source node and a target node. In various embodiments, one or more of the source node and target node can be implicit or determined by the communications network in response to the demand.

The communications network can satisfy the demands using one or more routes provided through the communications network. Each route can be implemented using hardware (e.g., transceivers, or the like) or software resources (e.g., compute, memory, or the like) of the communications network. Consistent with disclosed embodiments, each route can include one or more service links (e.g., light paths between two nodes in an optical network through which light passes unmodified, or the like). The greater the burden associated with the service link(s) corresponding to a route, the greater the burden associated with the route. The more routes required to satisfy the demand, the greater the burden on the communication network.

Efficient route selection can reduce the number of routes required to satisfy a set of demands. For example, routes can be selected to satisfy multiple demands. Given an original set of routes that satisfy a set of demands, an efficient route selection problem can involve determining whether another, preferable set of routes exists that still satisfies the original set of demands. In some instances, the preferable set of routes may include fewer routes. In other instances, a weight associated with the preferable set of routes may be less than a weight associated with the original set of routes. The weights may reflect characteristics (e.g., scarcity, capacity, processing or memory constraints, cost, serviceability, readiness, or the like) of the links or network devices used to implement each set of routs. Unfortunately, selecting an optimal set of routes is an NP-hard problem. Therefore, polynomial-time determination the optimal set of routes selection cannot be guaranteed.

FIG. 1 depicts an exemplary communication network 100, consistent with disclosed embodiments. Communication network 100 includes, for example, a network 140, network management system 150, database 170, nodes 120A-120E (collectively nodes 120), and client devices 130A-130E (collectively client devices 130). Nodes 120 and client devices 130 form a service network 160, in which the nodes 120 provide data services to client devices 130. The nodes can include hardware-based or software-based switches, routers, splitters, or the like that facilitate delivery of data services to client devices 130. The components and arrangements shown in FIG. 1 are not intended to limit the disclosed embodiments, as the system components used to implement the disclosed processes and features can vary. For example, each of nodes 120 may be associated with no, one, or many client devices 130. In various embodiments, service network 160 may be based on one or more of on-premises network environments, virtualized (cloud) network environments, or combinations of on-premises and cloud networks. Consistent with embodiments described herein, various types of data may be communicated over service network 160, such as Internet (e.g., IP protocol) data, telephony or telecommunications data, satellite data, IoT-based data, cellular data, proprietary network data, and more.

Network management system 150 can be a computer-based system including computer system components, desktop computers, workstations, tablets, handheld computing devices, memory devices, and/or internal network(s) connecting the components. Network management system 150 can be configured to manage service deliveries for the service network 160. For example, the network management system 150 may determine network routes and allocate resources for demands in the communication network 100. The network management system 150 may select, given a set of original routes that satisfy a set of demands, an updated set of routes that satisfy the set of demands.

Network 140 can facilitate communication between the network management system 150 and the service network 160. Network management system 150 may send data to nodes 120 via network 140 to allocate resources for demands in the communication network 100. Network management system 150 may also receive data from nodes 120 via network 140 indicating the status of communication links in the communication network 100. Network 140 may be an electronic network. Nodes 120 may be configured to receive data over network 140 and process/analyze queries and data. Examples of network 140 include a local area network (LAN), a wireless LAN (e.g., a "WiFi" or mesh network), a Metropolitan Area Network (MAN) that connects multiple LANs, a wide area network (WAN) (e.g., the Internet), a dial-up connection (e.g., using a V.90 protocol or a V.92 protocol), a satellite-based network, a cellular-based network, etc. In the embodiments described herein, the Internet may include any publicly accessible network or networks interconnected via one or more communication protocols, including, but not limited to, hypertext transfer protocol (HTTP/s) and transmission control protocol/internet protocol (TCP/IP). Moreover, the electronic network may also include one or more mobile device networks, such as a Long-Term Evolution (LTE) network or a Personal Communication Service (PCS) network, that allow mobile devices (e.g., client devices 130) to send and receive data via applicable communication protocols, including those described above.

In the illustrated example, nodes 120A and 120E are directly connected to network 140, and nodes 120B-120D connect to the network 140 via their connection to nodes 120A and/or 120E. Nodes 120B-120D may also directly connect to the network 140, or may indirectly connect to the network 140 through numerous other devices. Nodes 120 may be connected to one another via copper wire, coaxial cable, optical fiber, microwave links, or other satellite or radio communication components. Accordingly, nodes 120 may each have a corresponding communications interface (e.g., wireless transceiver, wired transceiver, adapter, etc.) to allow for such communications.

As shown in FIG. 1, nodes 120A-120E are connected to one another. In this example, node 120A is connected to node 120B, node 120B is connected to node 120A, 120C, and 120D, node 120C is connected to node 120B, 120D, and 120E, node 120D is connected to nodes 120B and 120C, and node 120E is connected to node 120C. In some embodiments, the network management system 150 may obtain the connectivity status between the network devices and generate a representation (e.g., a graph) of the connectivity of the network. In various embodiments, the network management system 150 can acquire the network topology from a server or a database associated with a service provider providing the service network 160. As may be appreciated, the service network 160 illustrated in FIG. 1 is not intended to be limiting. The disclosed embodiments include other service network configurations and topologies.

Network management system 150 can be implemented using one or more computing device (e.g., a node of node 120, a mobile device, laptop, desktop, workstation, server, computing cluster or cloud computing platform, or the like). Network management system 150 can be implemented as a distributed system over multiple computing devices. The disclosed embodiments are not limited to any particular implementation of network management system 150. In some embodiments, network management system 150 can be implemented over the nodes of service network 160.

Database 170 can include one or more physical or virtual storages coupled with the network management system 150. Database 170 may be configured to store information associated with the service network 160, such as a network topology, the capabilities of the nodes 120, the demands and corresponding configurations (e.g., routes or the like) provided by the service network 160, and so on. Database 170 may also be adapted to store processed information associated with the network topology and demands in the service network 160, so as to facilitate efficient route configurations and resource allocations to satisfy the demands in the service network 160. The data stored in the database 170 may be transmitted to the network management system 150 and/or the nodes 120. In some embodiments, the database 170 can be stored in a cloud-based server (not shown) accessible to the network management system 150 and/or the nodes 120 through the network 140. While the database 170 is illustrated as an external device connected to the network management system 150, the database 170 may also reside within the network management system 150 as an internal component of the network management system 150. In some embodiments, the database 170 can be distributed among the nodes of service network 160.

As shown in FIG. 1, nodes 120 can be connected with client devices 130 respectively to service demands. As an example, client devices 130 may include a display such as a television, tablet, computer monitor, video conferencing console, IoT device, or laptop computer screen. Client devices 130 may also include video/audio input devices such as a video camera, web camera, or the like. As another example, client devices 130 may include mobile devices (e.g., a wearable device, a tablet, a smartphone, a laptop, or other mobile device having display and video/audio capture capabilities). While FIG. 1 shows one client device connected to each node, zero or more client devices may be connected to a node.

In some embodiments, communication network 100 can include an optical network, where the nodes 120 are interconnected by optical fiber links. Such optical fiber links can include optical fiber links that support communication over multiple optical channels using multiple optical wavelengths. The optical network can be implemented, as least in part, using a wavelength division multiplexing (WDM) physical layer. A WDM optical signal can use a plurality of transmission channels, each channel carrying an information signal modulated over a carrier wavelength. A node can be configurable to switch a channel from an input fiber to an output fiber, or to add/drop traffic. A node can include a wavelength switch or an optical add/drop multiplexer that performs optical add, drop, and pass through. A node may include optical or optical/electrical elements configurable to perform functions including compensating, amplifying, switching, restoring, performing wavelength conversion of incoming optical signals, etc. The optical fiber links may include dispersion compensation fibers (DCF), optical filters, amplifiers, and other relevant optical components suitable for operation of optical networks. The network management system 150 or database 170 can store topologic data that includes information about optical channels and their associated wavelengths.

As described herein, network management system 150 (or another component of communication network 100) can be configured to determine routing and wavelength assignment for a given set of demands. For example, network management system 150 may select, given a set of original routes that satisfy a set of demands, an updated set of routes that satisfy the set of demands. In some implementations, such routes can be characterized by a sequence of communication links and an assigned wavelength number.

Figure 2:
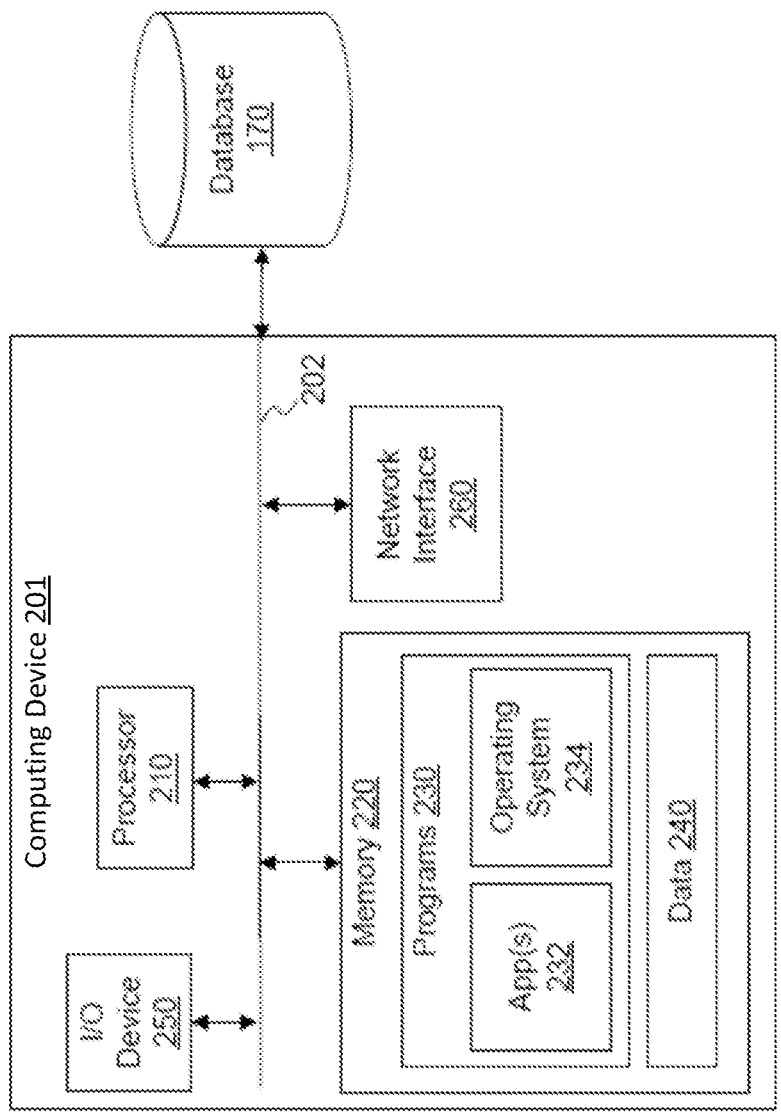
FIG. 2 depicts a diagram of an exemplary computing device suitable for implementing a network management system, consistent with disclosed embodiments.

FIG. 2 depicts a diagram of an exemplary computing device 201 (e.g., a mobile device, laptop, desktop, workstation, network appliance, or the like) suitable for implementing network management system 150, consistent with the disclosed embodiments. Network management system 150 can be implemented using one or more such computing devices 201 (e.g., a single computing device, a cluster of such computing devices, a virtual computing device running on such a computing device, a cloud-computing platform implemented using such devices, or another suitable implementation). Network management system 150 can be configured, by configuring the computing device(s) implementing network management system 150, to perform systems and methods for managing a communication network, consistent with disclosed embodiments. In such a manner, network management system 150 can be configured to determine, given an original set of routes that satisfy a set of demands, an updated set of routes for satisfying the demands.

The computing device 201 can include a bus 202 (or other communication mechanism) which interconnects subsystems and components for transferring information within the computing device. As shown, the computing device 201 can include one or more processors 210, input/output ("I/O")

devices 250, network interface 260 (e.g., a modem, Ethernet card, or any other interface configured to exchange data with a network), and one or more memories 220 storing programs 230 including, for example, server app(s) 232, operating system 234, and data 240, and can communicate with an external database 170 (which, for some embodiments, may be included within the computing device 201).

The processor 210 can be a central processing unit (CPU), graphical processing unit (GPU), application specific integrated circuit (ASIC) of system on a chip (SoC), field programmable gate array (FPGA), or the like. The processor 210 may comprise a single core or multiple core processors executing parallel processes simultaneously. For example, the processor 210 may be a single-core processor configured with virtual processing technologies. In certain embodiments, the processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the computing device 201 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232 and operating system 234, and data 240. Possible forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, or any other flash memory, NVRAM, a cache, a register, any other memory chip or cartridge, and networked versions of the same.

Computing device 201 may include one or more storage devices configured to store information used by processor 210 (or other components) to perform certain functions related to the disclosed embodiments. For example, computing device 201 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to computing device 201) or external storage communicatively coupled with computing device 201 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft™ SQL databases, SharePoint databases, Oracle™ databases, Sybase™ databases, or other relational databases.

In some embodiments, computing device 201 may be communicatively connected to one or more remote memory devices (e.g., remote databases or the like) through network 140 or a different network. The remote memory devices can be configured to store information that the computing device 201 can access and/or manage. By way of example, the remote memory devices could be document management systems, Microsoft™ SQL database, SharePoint databases, Oracle™ databases, Sybase™ databases, or other relational databases. Systems and methods consistent with disclosed embodiments, however, are not limited to separate databases or even to the use of a database.

The programs 230 may include one or more software modules configured to cause processor 210 to perform one or more functions of the disclosed embodiments. Moreover, the processor 210 may execute one or more programs located remotely from one or more components of the communication network 100. For example, computing device 201 may access one or more remote programs that, when executed, perform functions related to disclosed embodiments.

In the presently described embodiment, server app(s) 232 can cause the processor 210 to perform one or more functions of the disclosed methods. For example, the server app(s) 232 cause the processor 210 to determine routes and allocate resources for services to be delivered in the communication network 100.

In some embodiments, the program(s) 230 may include the operating system 234 performing operating system functions when executed by one or more processors such as the processor 210. By way of example, the operating system 234 may include Microsoft Windows™, Unix™, Linux™, Apple™ operating systems, Personal Digital Assistant (PDA) type operating systems, such as Apple iOS™, Google Android™, Blackberry OS™, or other types of operating systems. Accordingly, disclosed embodiments may operate and function with computer systems running any type of operating system 234. Computing device 201 may also include software that, when executed by a processor 210, provides communications with network 140 through the network interface 260 and/or a direct connection to one or more nodes 120A-120E.

In some embodiments, data 240 may include, for example, network configurations, requirements of demands, routes for satisfying the demands and relationships between the routes, capacities of the network devices, and so on. For example, data 240 may include network topology of the service network 160 and operating status (e.g., operating properly or not operating properly) of the communication links between the nodes 120. The data 240 may also specify demand requirements and routes for each demand in the service network 160.

Computing device 201 may also include one or more I/O devices 250 having one or more interfaces for receiving signals or input from devices and providing signals or output to one or more devices that allow data to be received and/or transmitted by the network management system 150. For example, computing device 201 may include interface components for interfacing with one or more input devices (e.g., keyboard(s), mouse device(s), and the like) that enable computing device 201 to receive input from an operator or administrator (not shown).

FIGS. 3A to 3D depict generation of a set of irreducible paths from a set of original network paths on a network graph 300, consistent with disclosed embodiments. Network graph 300 can represent a communications network (e.g., service network 160, or the like). Network graph 300 can include nodes (e.g., node 320, or the like) corresponding to network devices in the communications network (e.g., ones of nodes 120). In some embodiments, a node in network graph 300 can correspond to multiple network devices separated by communications links (e.g., a node can correspond to a connected graph of the multiple network devices). Network graph 300 can include edges (e.g., edge 330, or the like) connecting nodes. Such edges can correspond to communication links connecting network devices in the communications network. In some embodiments, an edge in network graph 300 can correspond to multiple communications links separated by network devices (e.g., an edge can correspond to a connected graph of the multiple communications links).

Figure 3A:
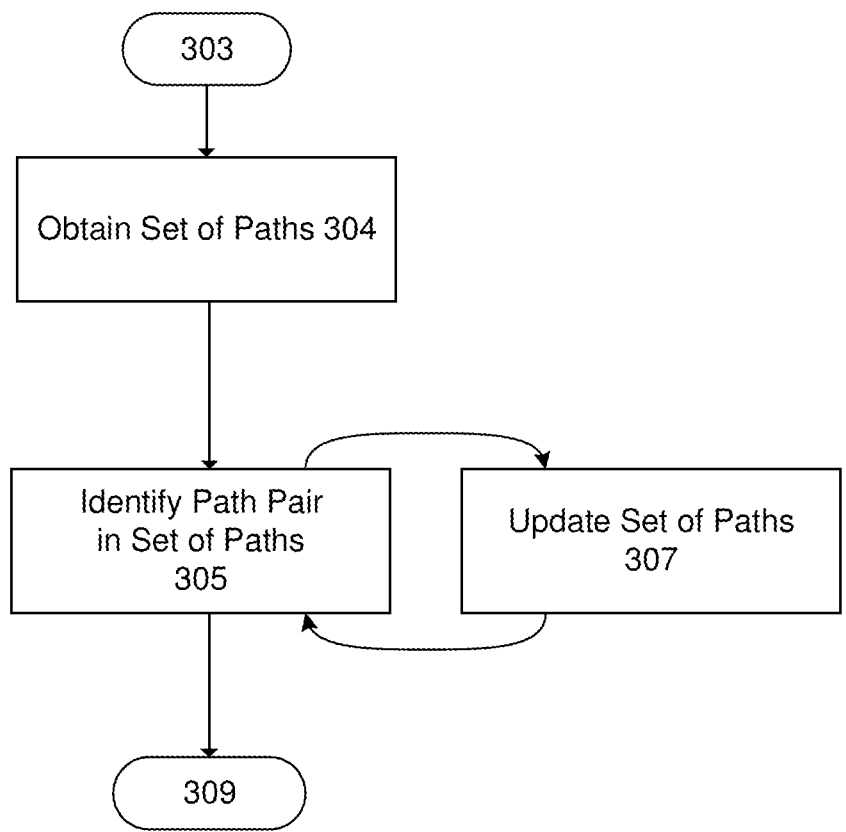

FIG. 3A depicts a process 301 for generating a set of irreducible paths, in accordance with disclosed embodiments. Process 301 can be performed by a network management system (e.g., network management system 150 or another suitable system). Process 301 can support identification of an efficient set of routes for satisfying a set of demands on the communications network. In some embodiments, the efficient set of routes can include routes on the communications network that correspond to the irreducible paths on the network graph. In some embodiments, the irreducible paths can be used to identify suitable paths on the network graph. The efficient set of routes can then include routes on the communications network that correspond to these identified paths. For example, a bipartite graph as described with respect to FIGS. 4A and 4B can be generated using process 301. The bipartite graph can be used to identify the suitable paths. As an additional example, stopping points and relevant sub-paths, as described with regards to FIGS. 6A and 6B, can be identified using process 301. The stopping points and relevant sub-paths can be used to generate an auxiliary graph. The auxiliary graph can then be used to identify suitable paths.

Consistent with disclosed embodiments, process 301 can start in step 303. In some embodiments, a network management system 150 can obtain network graph 300 in step 303. For example, the network management system 150 can obtain a network topology from the network devices of a communications network, or from a database, or another system, or the like. The network management system 150 can create network graph 300 representing the communications network using the network topology. As an additional example, the network management system 150 can receive or retrieve network graph 300 from the network devices of a communications network, or from a database, or another system, or the like.

Consistent with disclosed embodiments, process 301 can proceed to step 304. In step 304, the network management system 150 can obtain a set of network paths. In some embodiments, the network management system 150 can obtain information specifying demands and corresponding routes supported by the communications network from the network devices of the communications network, or from a database, or another system, or the like. The network management system 150 can determine the network paths on the network graph from the specified routes on the communication network (e.g., when a route includes a communication link between two network devices, the network management system 150 can specify that a corresponding network path includes an edge between two nodes in the network graph corresponding to the two network devices).

In some embodiments, the network management system 150 can obtain the retrieve or receive the set of network paths from the network devices of the communications network, or from a database, or another system, or the like.

Consistent with disclosed embodiments, process 301 can proceed to step 305. In step 305, the network management system 150 can identify a path pair in the set of network paths, such that one or more of the path pair can be split. Given a set of paths P and two paths p E P and p' E P, then p' and p can be split if there exists sub-paths $p_1$, $p_2$, and $p_2'$ such that:

$$p = p_1 \cdot p_2$$

$$p' = p_1 \cdot p_2'$$

where · is the concatenation operator. Note that either $p_2'$ or $p_2$ can be a null path.

Consistent with disclosed embodiments, process 301 can proceed to step 307. In step 307, the set of network paths can be updated. Updating the set of network paths can include replacing p and p' with the sub-paths identified in step 305. For example, if $p_2'$ is not a null path then the set of network paths can be updated to include $p_2'$. Likewise, if p 2 is not a null path then the set of network paths can be updated to include $p_2$. If neither $p_2'$ nor $p_2$ is a null path then the set of network paths can be updated to include $p_1$.

Consistent with disclosed embodiments, process 301 can return to step 305. The network management system 150 can then identify a path pair in the updated set of network paths. If no path pair can be identified, then process 301 can proceed to step 309.

In step 309, process 301 can terminate. In some embodiments, the network management system 150 can perform additional operations using the set of irreducible paths.

In various embodiments, the network management system 150 can determine whether a criterion dependent on the set of irreducible paths and the original set of network paths (those received in step 303) has been satisfied. In some embodiments, the criterion can be a weight criterion. The weight criterion can be satisfied if a weight of the original set of network paths is greater than a weight of the set of irreducible paths. The weights of the original set of network paths and the set of irreducible paths can depend on paths in each set. In some embodiments, weights can be associated with the nodes that are endpoints of the paths in each set. For example, when a path is in the original set of network paths, the weights for the nodes that are the endpoints of that path can contribute to the overall weight for the original set of network paths. In some embodiments, weights can be associated with the paths in each set. For example, when a path is in the set of irreducible paths, the weight for that path can contribute to the overall weight for the set of irreducible paths.

As may be appreciated, if the nodes have zero weight and the edges have equal weight, then the weight criterion is satisfied when the set of irreducible paths is smaller than the original set of network paths. Similarly, when the edges have zero weight and the nodes have equal weight, the weight criterion is satisfied when the set of nodes used by the set of irreducible paths is smaller than the set of nodes used by the original set of network paths.

In some embodiments, when the criterion is satisfied, the network management system 150 can configure the communications network to satisfy the demands associated with the set of original routes using the set of irreducible routes. The network management system 150 can be configured to provide instructions to the network devices of the communications network. When executed by the network devices, these instructions can cause the communications network to implement the set of irreducible routes for satisfying the demands.

While generation of the set of irreducible paths has been described with respect to an in-place updating of an original set of network paths, the disclosed embodiments are not so limited. In some embodiments, a copy of the original set of network paths can be updated to create the set of irreducible paths. In various embodiments, rather than updating an existing set of paths in step 307, process 301 can include creating a new set that includes the updated paths. Process 301 can then perform step 305 on the new set of paths.

FIGS. 3B to 3D depict generation of a set of irreducible paths for network graph 300, consistent with disclosed embodiments. FIG. 3B depicts the original set of paths (e.g., path 321, path 323, path 325, and path 327). FIG. 3C shows the updated set of paths after an iteration of steps 305 and 307 of process 301. The path pair of paths 321 and 323 has been replaced with the common path 333 and the sub-paths 331 and 335. FIG. 3D shows the updated set of paths after a second iteration of steps 305 and 307 of process 301. The path pair of paths 325 and 327 has been replaced with the common path 343 and the irreducible sub-paths 341 and 345. As may be appreciated, real-world examples may include more iterations than the two iterations in this limited example. Furthermore, paths in the original set of paths may be broken down into sub-paths, which may, in turn, be further broken down into sub-sub-paths.

FIGS. 4A and 4B depict bipartite graphs constructed using original network paths and irreducible paths, consistent with disclosed embodiments. FIG. 4A depicts an example using the original network paths depicted in FIG. 3B and the irreducible paths depicted in FIG. 3D. Consistent with disclosed embodiments, a network management system 150 can be configured to construct such a bipartite graph. The network management system 150 can construct the bipartite graph using information obtained from a communications network (e.g., one or more network devices of the communications network) or obtained from another system. In some embodiments, the information could include a graph representing the communications network. In some embodiments, the information could be useable to construct such a graph (e.g., information describing individual links between communications devices on the communications network). In some embodiments, the information can include the set of original network paths (or information useable to generate the set of original network paths, such as the set of demands o the network). The network management system 150 can then generate the set of irreducible paths as described with respect to FIG. 3A. In some embodiments, the network management system 150 can receive or retrieve the set of irreducible paths from the communications network or another system.

As depicted in FIG. 4A, a bipartite graph can include two disjoint sets of vertices, consistent with disclosed embodiments. A first set of the vertices, original path vertices 411, can include vertices that correspond to the paths in the original set of network paths. For example, vertex 415 can correspond to path 327. A second set of the vertices, irreducible path vertices 413, can include vertices that correspond to the paths in the set of irreducible paths. For example, vertex 418 can correspond to the irreducible sub-path 345. For convenience, the vertices are labeled with the concatenated labels of the nodes included in the corresponding path. Thus vertex 415 is labeled cdfg as path 327 includes nodes c, d, f, and g.

As depicted in FIG. 4A, a bipartite graph can include edges that indicate decomposition relationships between vertices, consistent with disclosed embodiments. Each edge can connect one of original path vertices 411 to one of irreducible path vertices 413 and can indicate that the one of the original path vertices can be decomposed into the one of the irreducible path vertices 413. For example, edge 417 connects vertex 415 to vertex 418 and indicates that the path (c, d, f, g) can be decomposed into a set of irreducible paths including the irreducible path (d, f, g). As may be appreciated from this example, connections between original path vertices 411 and irreducible path vertices 413 can be many-to-many.

As depicted in FIG. 4B, a bipartite graph can include multiple connected components (e.g., first connected component 421 and second connected component 423).

Consistent with disclosed embodiments, a network management system 150 can use a bipartite graph to generate an updated set of routes for a communication network. As described herein, the network management system 150 can update the routes when a criterion, such as a weight criterion, is satisfied. In some embodiments, the network management system 150 can determine whether the criterion is satisfied for the entire sets of original paths and irreducible paths. In various embodiments, the network management system 150 can determine whether the criterion is satisfied for each connected component in the bipartite graph.

In the example depicted in FIG. 4B, the criterion may be a weight criterion. A weight of one may be assigned to each path and a weight of zero assigned to each node. The weight criterion can be satisfied when the weights for the irreducible path vertices in a connected component are less than the weights for the original path vertices in that connected component (i.e., the set of irreducible path vertices in the connected component is smaller than the set of original path vertices in the connected component). As depicted in FIG. 4B, the criterion is satisfied for the first connected component, but not the second connected component.

The network management system 150 can provide instructions to the communications network to update the network routes based on the determination that the criterion is satisfied for the first connected component. As described herein, the original path vertices in first connected component 421 correspond to a subset of the original network paths. These original network paths, in turn, correspond to routes on the communications network (i.e., original first-connected-component routes). Likewise, the irreducible path vertices in first connected component 421 correspond to a subset of the irreducible paths, that, in turn, correspond to routes on the communications network (i.e. irreducible first-connected-component routes). The network management system can provide instructions to the communications network (e.g., to the network devices of the communications network) to replace the original first-connected-component routes with the irreducible first-connected-component routes. In this example, routes corresponding to the original network paths in the second connected component may not be replaced, because the criterion is not satisfied for the second connected component.

In this example, determining whether the criterion is satisfied for each connected component yields a smaller set of paths (6 paths) than selected either the complete set of original paths (7 paths) or the complete set of irreducible paths (7 paths).

FIGS. 5A to 9G depict determination of an updated set of paths using an auxiliary graph, in accordance with disclosed embodiments. Consistent with disclosed embodiments, the envisioned auxiliary graph can be used by a network management device (or another system) to determine a more-efficient (e.g., lower weighted, or the like) set of paths for satisfying a set of demands, even when a connected-component-wise selection between original paths and irreducible paths does not produce such an improvement.

Figure 5D:
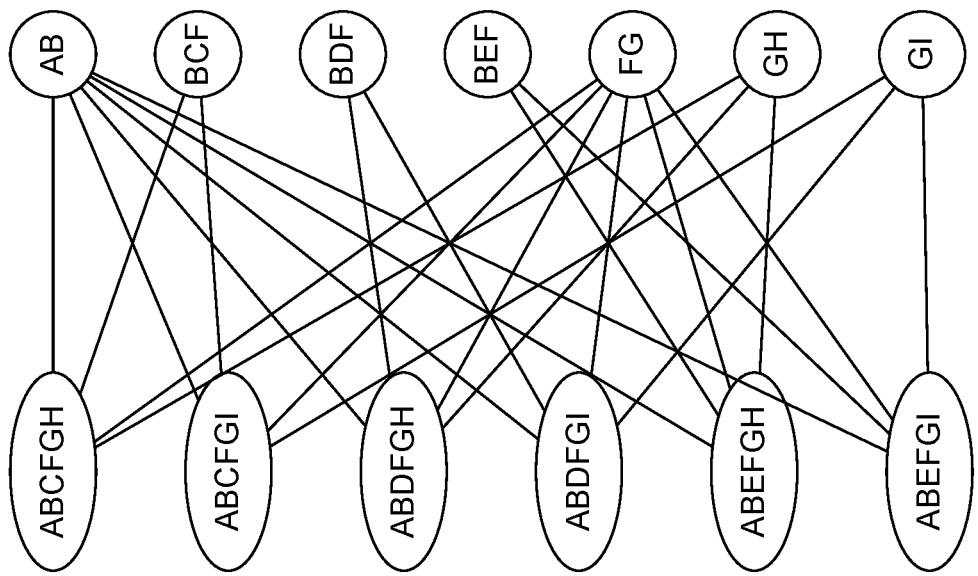
FIGS. 5A to 5D depict an exemplary network graph and original network paths used to generate an auxiliary graph, consistent with disclosed embodiments.
Figure 5A:
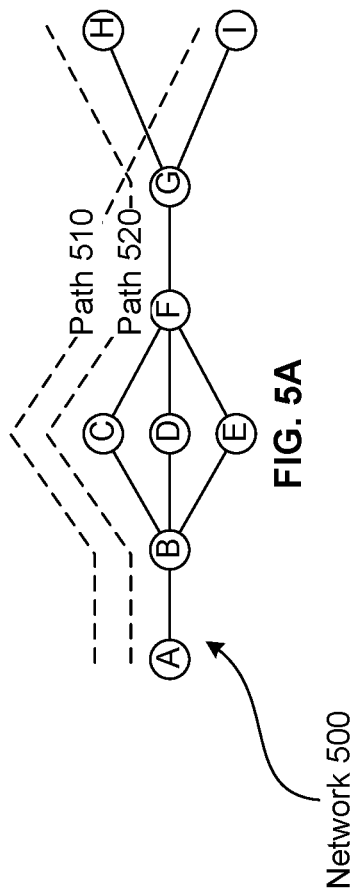
Figure 5B:
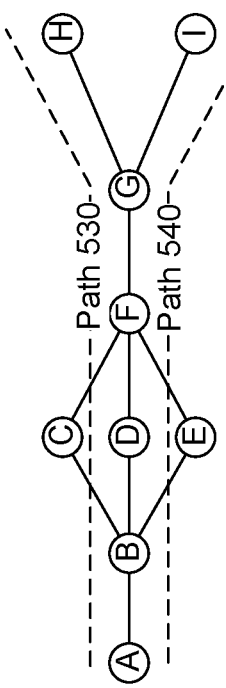
Figure 5C:
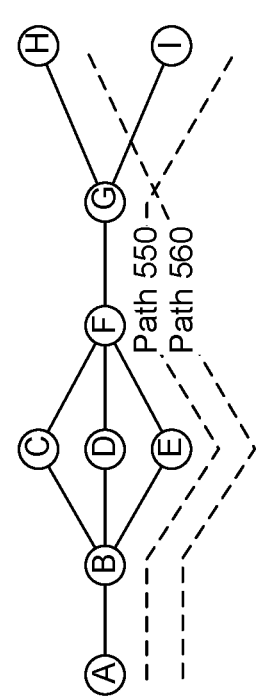

FIGS. 5A to 5C depict an exemplary network graph 500 and original network paths (e.g., paths 510 to 560) used to generate an auxiliary graph, consistent with disclosed embodiments. FIG. 5D depicts an exemplary bipartite graph corresponding to network graph 500 and the original network paths. Construction of the bipartite graph can include generation of a set of irreducible paths, as described with regards to FIG. 3A. As described with regards to FIGS. 4A and 4B, the bipartite graph can include two disjoint sets of vertices, one set corresponding to the original network paths and the other set corresponding to the irreducible paths. Vertices corresponding to original network paths can be connected by edges to vertices corresponding to irreducible paths.

The bipartite graph depicted in FIG. 5D includes only a single connected component. Furthermore, the set of irreducible paths is larger than the set of original network paths. In this example, each path has an equal weight and vertices have zero weight. Accordingly, the weight for the set of irreducible paths is greater than the weight for the set of original paths. Therefore the bipartite graph does not provide a more-efficient set of paths than the set of original network paths. However, using an auxiliary graph, a set of paths can be generated that satisfy the demands of the original network paths, yet include fewer paths than the set of original network paths.

Constructing the auxiliary graph can include identifying stopping points and relevant sub-paths can be identified on network graph 500. FIG. 6A depicts the stopping points on network graph 500, consistent with disclosed embodiments. The stopping points can be the endpoints of the irreducible paths generated based on the set of original network paths. FIG. 6B depicts two relevant sub-paths of the path 530: relevant sub-path 620 and relevant sub-path 630. A relevant sub-path can be a sub-path of an original network path that has stopping points as endpoints. The set of original paths and the set of irreducible paths are both subsets of the set of relevant sub-paths. In some embodiments, the stopping points and relevant sub-paths can be identified by a network management system (e.g., network management system 150, or the like).

The auxiliary graph can be constructed using the identified stopping points and relevant sub-paths, consistent with disclosed embodiments. The vertices of the auxiliary graph can each correspond to a stopping point. The edges of the auxiliary graph can correspond to the relevant sub-paths. In some embodiments, the auxiliary graph can be constructed by constructing and combination sub-auxiliary graphs. Each sub-auxiliary graph can correspond to one of the original network paths.

Figure 7A:
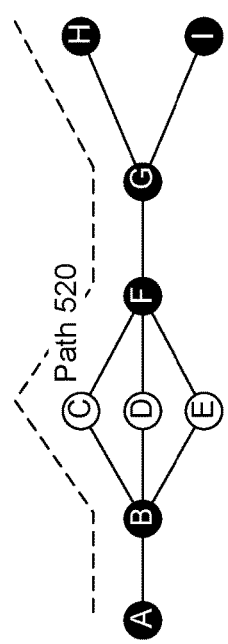
FIGS. 7A to 7D depict generation of sub-auxiliary graphs corresponding to original network paths on the network graph of FIGS. 5A to 5D, consistent with disclosed embodiments.
Figure 7B:
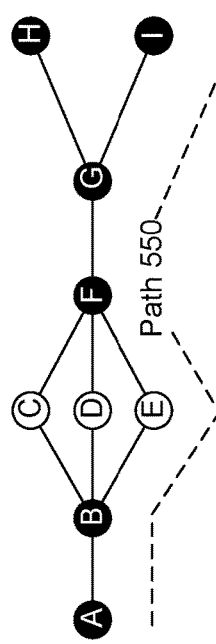

FIGS. 7A to 7D depict generation of sub-auxiliary graphs corresponding to original network paths on network graph 500, consistent with disclosed embodiments. FIGS. 7A and 7B depict the original network paths and stopping points. FIG. 7A depicts original network path 520, while FIG. 7B depicts original network path 550.

Figure 7C:
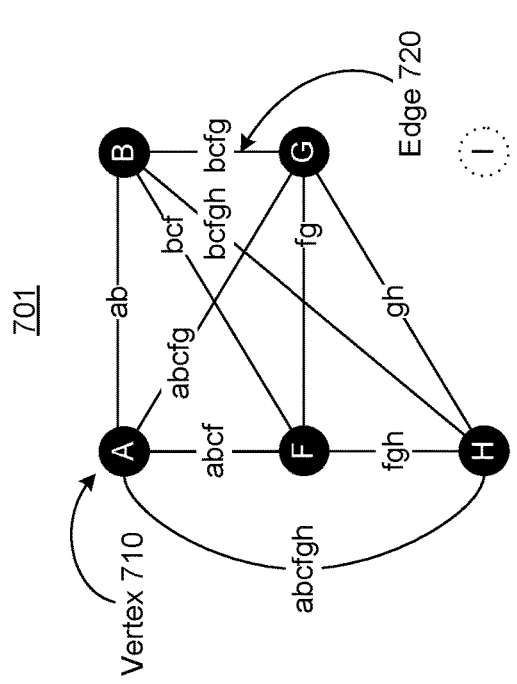

FIG. 7C depicts a sub-auxiliary graph 701 created using path 520 and the stopping points on network graph 500, consistent with disclosed embodiments. Sub-auxiliary graph 701 has vertices corresponding to stopping points on network graph 500. For example, vertex 710 corresponds to node A, a stopping point on network graph 500. Sub-auxiliary graph 701 has edges corresponding to each relevant sub-path of path 520. For example, edge 720 corresponds to the relevant sub-path of path 520 that starts at node B and ends at node G. Thus this edge connects the vertices of sub-auxiliary graph 701 corresponding to nodes B and G. While FIG. 7B depicts a vertex corresponding to node I, no relevant sub-path of path 520 begins or ends on node I. Accordingly, sub-auxiliary graph 701 does not include any edges connecting to this vertex.

Figure 7D:
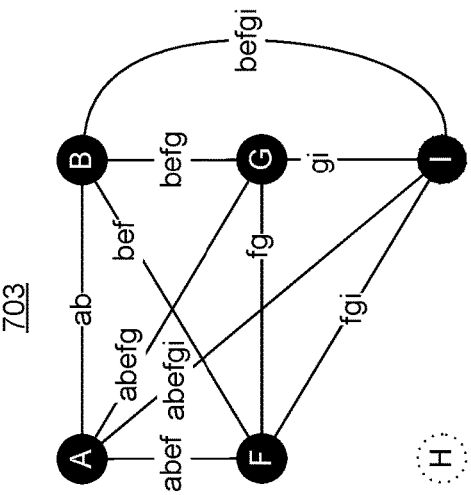

FIG. 7D depicts a sub-auxiliary graph 703 created using path 550 and the stopping points on network graph 500, consistent with disclosed embodiments. While FIG. 7D depicts a vertex corresponding to node H, no relevant sub-path of path 550 begins or ends on node H. Accordingly, sub-auxiliary graph 703 does not include any edges connecting to this vertex.

Sub-auxiliary graph 701 and sub-auxiliary graph 703 are both depicted in FIGS. 7C and 7D as including unconnected vertices (e.g., sub-auxiliary graph 701 includes a vertex corresponding to node I and sub-auxiliary graph 703 includes a vertex corresponding to node H). However, this depiction is not intended to be limiting. In some embodiments, sub-auxiliary graphs include only connected vertices.

Figure 8:
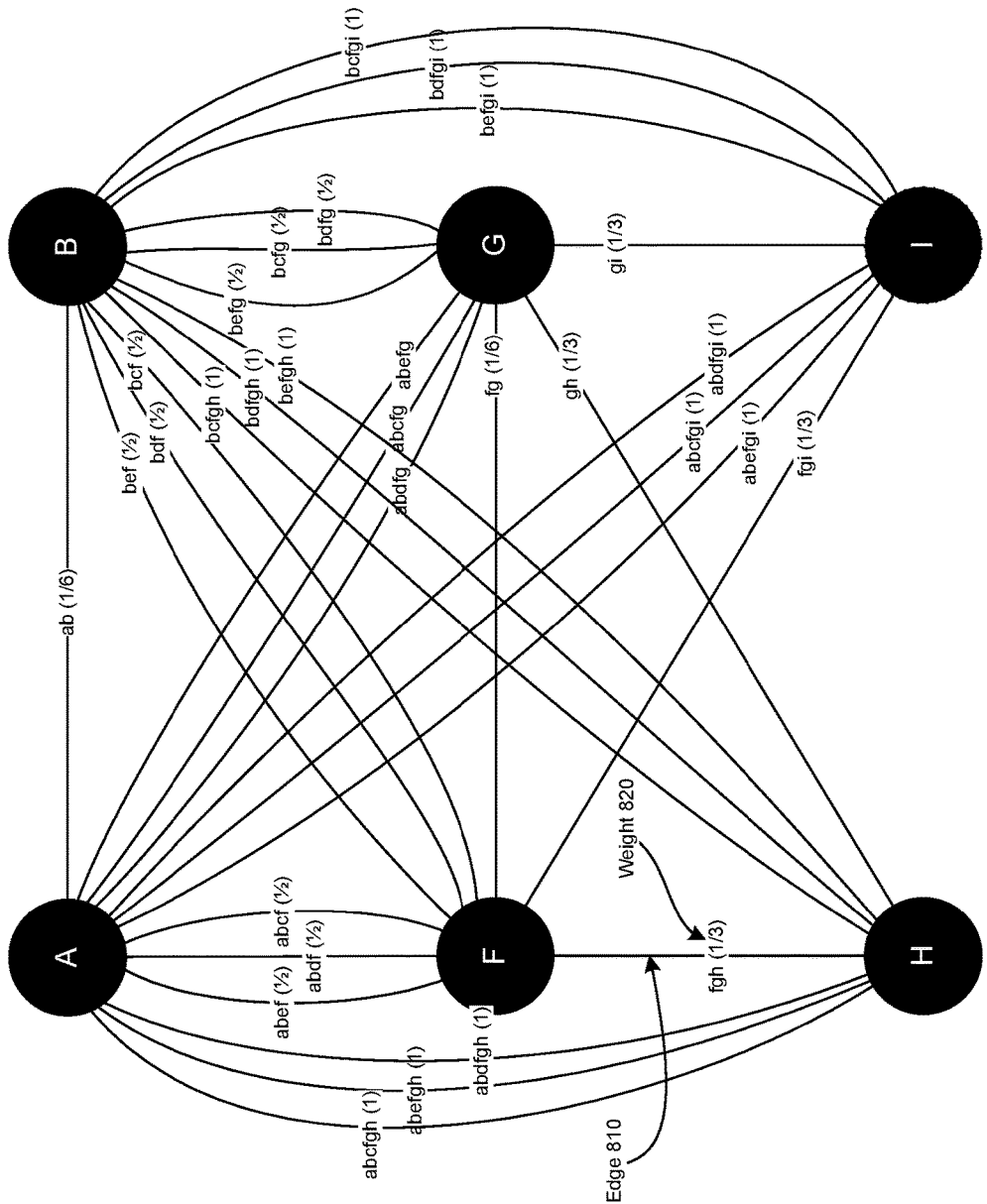
FIG. 8 depicts an auxiliary graph corresponding to the network graph and original paths of FIGS. 5A to 5D, consistent with disclosed embodiments.

FIG. 8 depicts an auxiliary graph 800 corresponding to network graph 500 and paths 510 to 560, in accordance with disclosed embodiments. An auxiliary graph, such as auxiliary graph 800, can be constructed by combining sub-auxiliary graphs, such as sub-auxiliary graphs 701 and 703. The auxiliary graph can have vertices corresponding to stopping points in the network graph and edges corresponding to the union of the edges in the sub-auxiliary graphs. Accordingly, the auxiliary graph can be a multigraph, with multiple edges connecting each vertex.

Consistent with disclosed embodiments, the auxiliary graph 800 can alternatively be constructed by selecting each pair of stopping points on the network graph. Zero of more edges can be constructed on the auxiliary graph between two vertices corresponding to the selected pair of stopping points. For each path on a network graph, an edge can be constructed between the two vertices if a relevant sub-path of the path connects the selected pair of stopping points.

As depicted in FIG. 8, weights can be associated with each edge of the graph. For example, edge 810, which connects the vertices corresponding to node f and node h on the network, has a weight 820. This weight can be a function of the relevant sub-path corresponding to the edge or the original paths on the network graph. For example, the weight can be a function of the edges included in the relevant sub-path (e.g., the number of such edges, weights associated with such edges, or the like) or the nodes included in the relevant sub-path (e.g., the number of such nodes, weights associated with such nodes, or the like). As an additional example, a number of the original paths can include the relevant sub-path. The weight can be a function of this number of the original paths. For example, as depicted in FIG. 8, the weight can be the inverse of this number. Edge 810 corresponds to relevant sub-path fgh. Paths 520, 530, and 560 all include this sub-path. So weight 820 is ⅓.

The disclosed embodiments are not limited to embodiments in which edges on the auxiliary graph have differing weights. In some embodiments, all such edges can have equal weights. In the simple graph depicted in FIG. 8, all the edge connecting two vertices have the same weight. However, this is not always true: two edges connecting the same two vertices can have differing weights. In some embodiments, the vertices of the auxiliary graph can have weights. These weights can depend on the weights of the nodes on the network graph corresponding to the vertices on the auxiliary graph.

FIGS. 9A to 9G depict use of a minimum edge disjoint paths (MEDP) method of selecting edges on auxiliary graph 800, consistent with disclosed embodiments. In some embodiments, this method can be performed by a network management system 150. The network management system 150 can provide instructions to the communications system to implement routes corresponding to the selected edges.

The method of FIGS. 9A to 9G may include selecting a path on auxiliary graph 800 corresponding to an original network path on network graph 500, consistent with disclosed embodiments. The path can be selected based on the weights of auxiliary graph 800. The path can be selected greedily, for example by selecting the path that uses the least number of new edges or vertices, or the path that uses the most edges or vertices previously selected for use by other paths. In some embodiments, the path can be selected according to the following equation:

$$\widehat{e_p} = \underset{p \in P, e_p \in E_p}{\operatorname{argmin}} w(e_p)$$

Where $p \in P$ is one of the original network paths in the network graph, $e_p \in E_p$ is one of the paths on the auxiliary graph 800 corresponding to the original network path p, $w(e_p)$ is the weight associated with path $e_p$ on the auxiliary graph 800, and $\widehat{e_p}$ is the path on the auxiliary graph 800 with the minimum weight over all paths on the auxiliary graph 800 for each path in the set of original network paths.

The method may also include updating the weights of the auxiliary graph after selecting the path on the auxiliary graph 800. When the edges of the auxiliary graph have weights, the edges included in the selected path can be updated. When the vertices of the auxiliary graph have weights, the weights of the vertices included in the selected path can be updated. Consistent with disclosed embodiments, the weights of the selected edges (or vertices) can be updated to favor future selection of these edges (or weights). For example, the weights of the selected edges (or vertices) can be updated to zero.

The method can be repeated until a path has been selected for each original path in the network graph. A union of the edges on the auxiliary graph included in the selected paths on the auxiliary graph can be determined. The relevant sub-paths corresponding to these edges can then be determined. The updated set of edges can be or include these relevant sub-paths.

The method can conclude with providing instructions to update the communication network to implement routes corresponding to the set of relevant sub-paths.

Figure 9A:
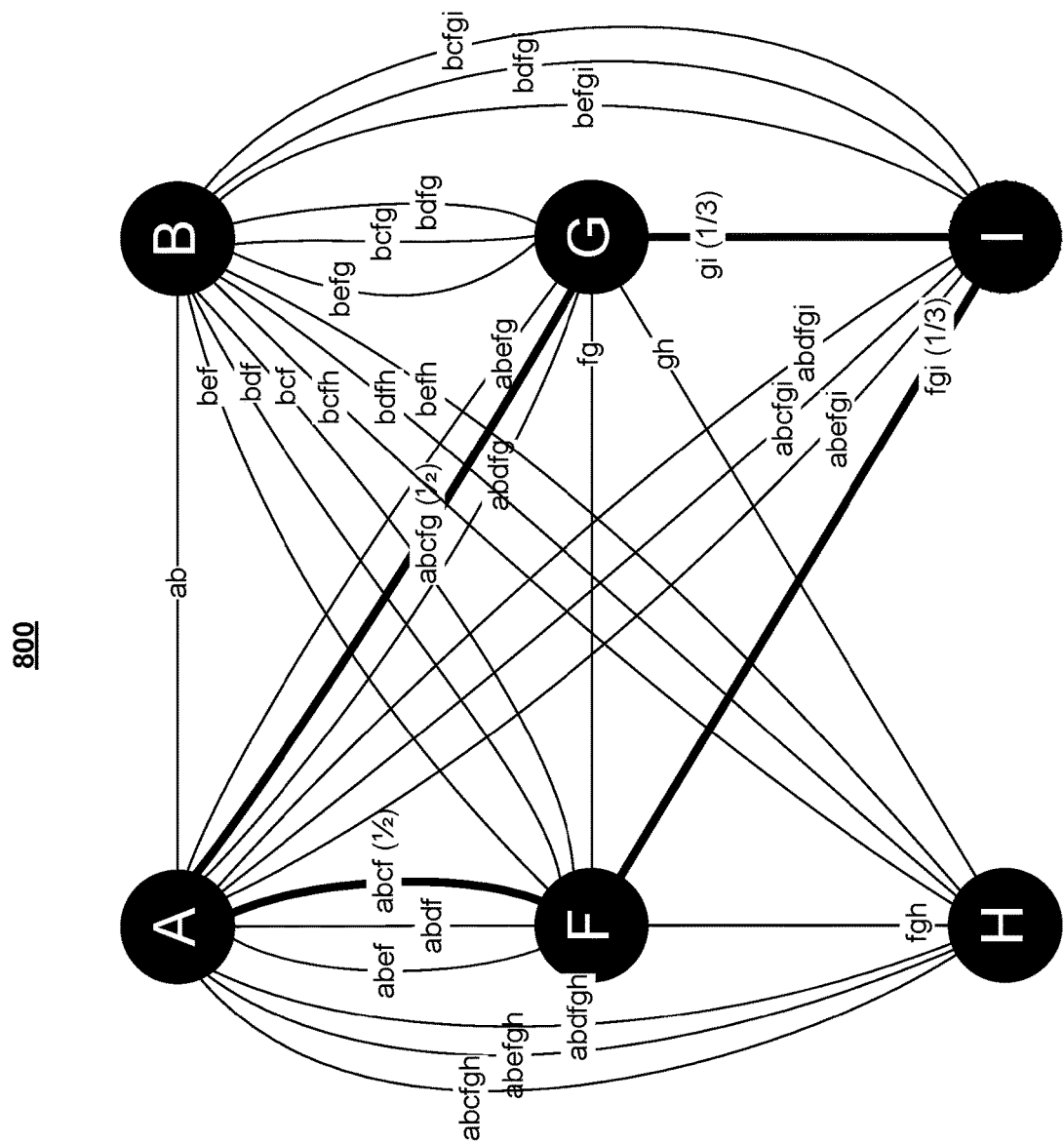
FIGS. 9A to 9G depict use of a minimum edge disjoint paths (MEDP) method of selecting edges on the auxiliary graph of FIG. 8, consistent with disclosed embodiments.

FIG. 9A depicts selection of a path on the auxiliary graph 800 corresponding to path 510 on network graph 500. Two paths on the auxiliary graph 800 have equal weights. A first path is 1) from stopping point A to stopping point F along edge abcf, and 2) from stopping point F to stopping point I along edge fgi. A second path is 1) from stopping point A to stopping point G along edge abcfg, and 2) from stopping point G to stopping point I along edge gi. In both cases, the sum of weights is ⅚. The disclosed embodiments are not limited to any particular method of selecting among paths having equal weight. In this example, the path from stopping point A to stopping point F to stopping point I is selected. The weights of edges abcf and fgi are updated to zero.

Figure 9B:
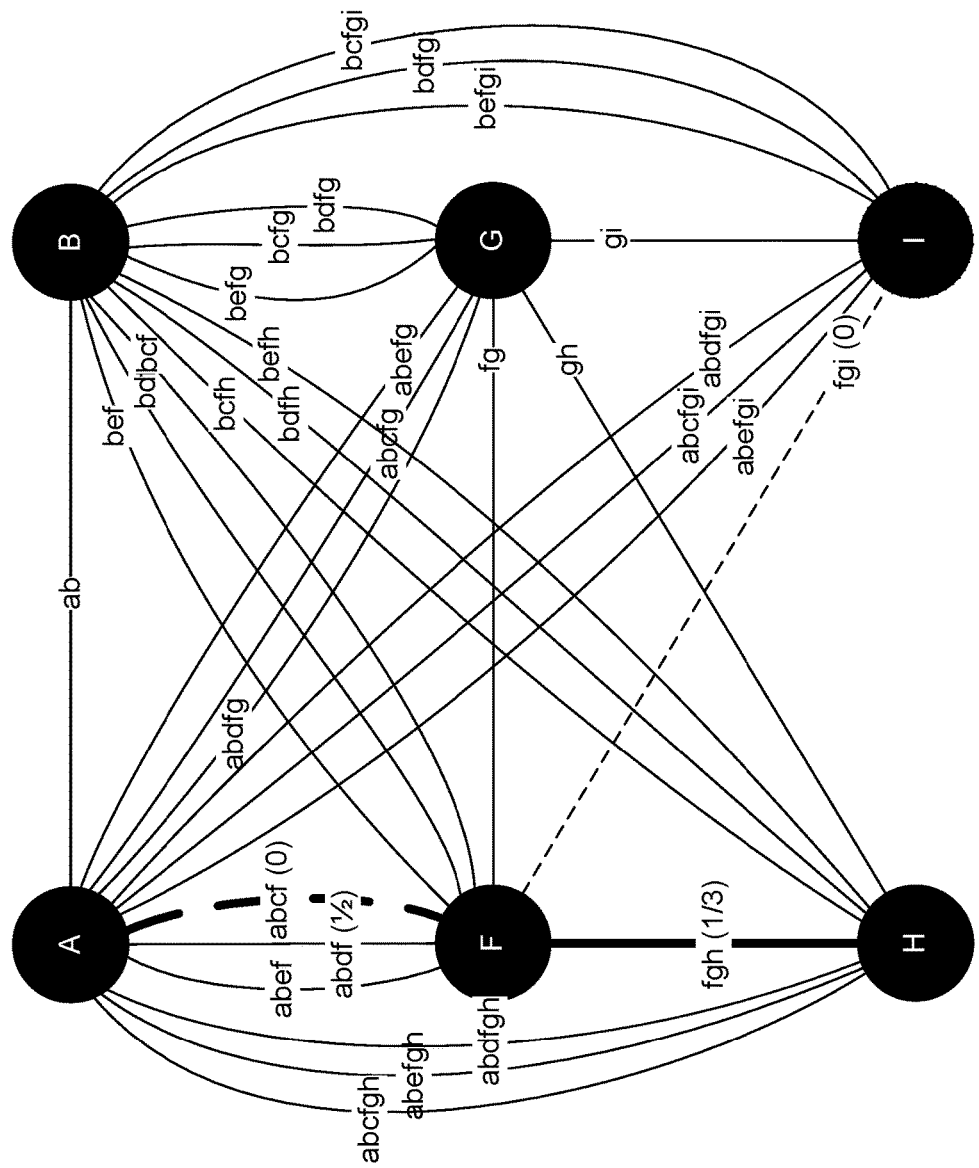

FIG. 9B depicts selection of a path on the auxiliary graph 800 corresponding to path 520 on network graph 500. Consistent with disclosed embodiments, a path on the auxiliary graph from stopping point A to stopping point F to stopping point H has the lowest weight (e.g., ⅓) among all paths on the auxiliary graph 800 for all remaining paths on the network graph (as the weight for edge abcf has been updated to zero). Therefore, this path is selected. The weight of edge fgh is updated to zero.

Figure 9C:
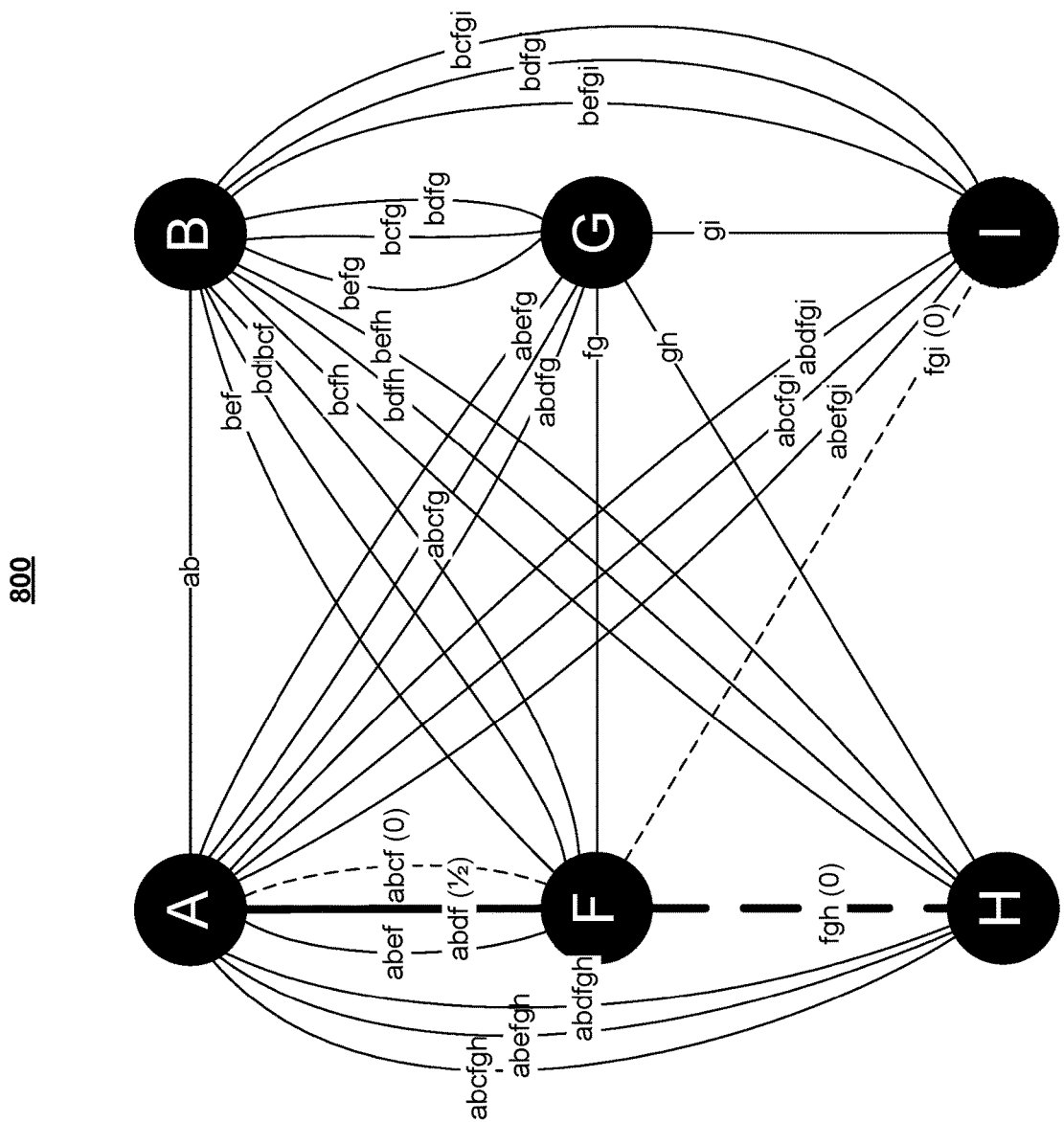

FIG. 9C depicts selection of a path on the auxiliary graph 800 corresponding to path 530 on network graph 500. Consistent with disclosed embodiments, a path on the auxiliary graph from stopping point A to stopping point F to stopping point H has the lowest weight (e.g., ½) among all paths on the auxiliary graph 800 for all remaining paths on the network graph (as the weight for edge fgh has been updated to zero). Therefore, this path is selected. The weight of edge abdf is updated to zero.

Figure 9D:
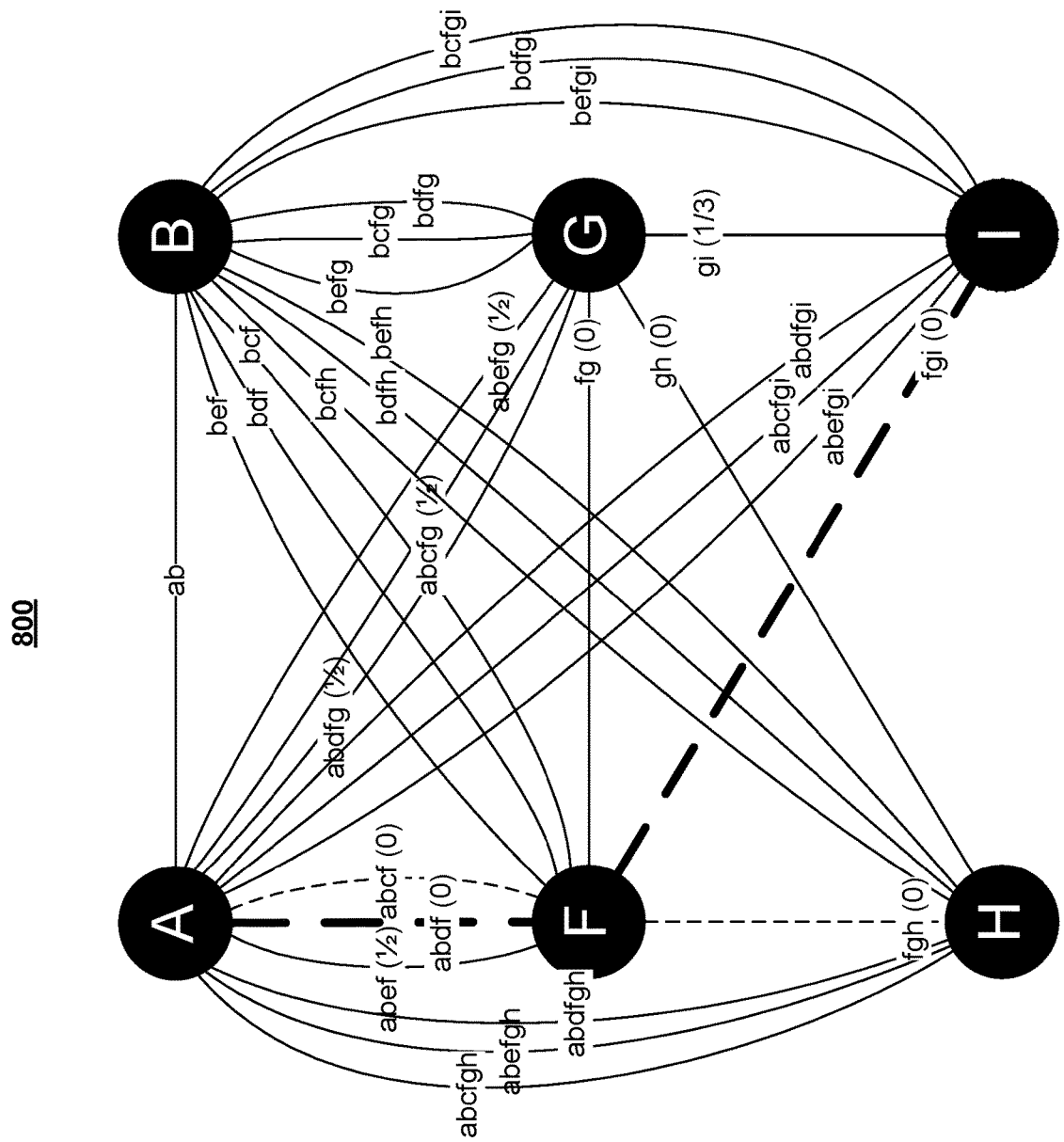

FIG. 9D depicts selection of a path on the auxiliary graph 800 corresponding to path 540 on network graph 500. Consistent with disclosed embodiments, a path on the auxiliary graph from stopping point A to stopping point F to stopping point I has the lowest weight (e.g., 0) among all paths on the auxiliary graph 800 for all remaining paths on the network graph (as the weight for edges abdf and fgi have been updated to zero). Therefore, this path is selected. No weights need be updated.

Figure 9E:
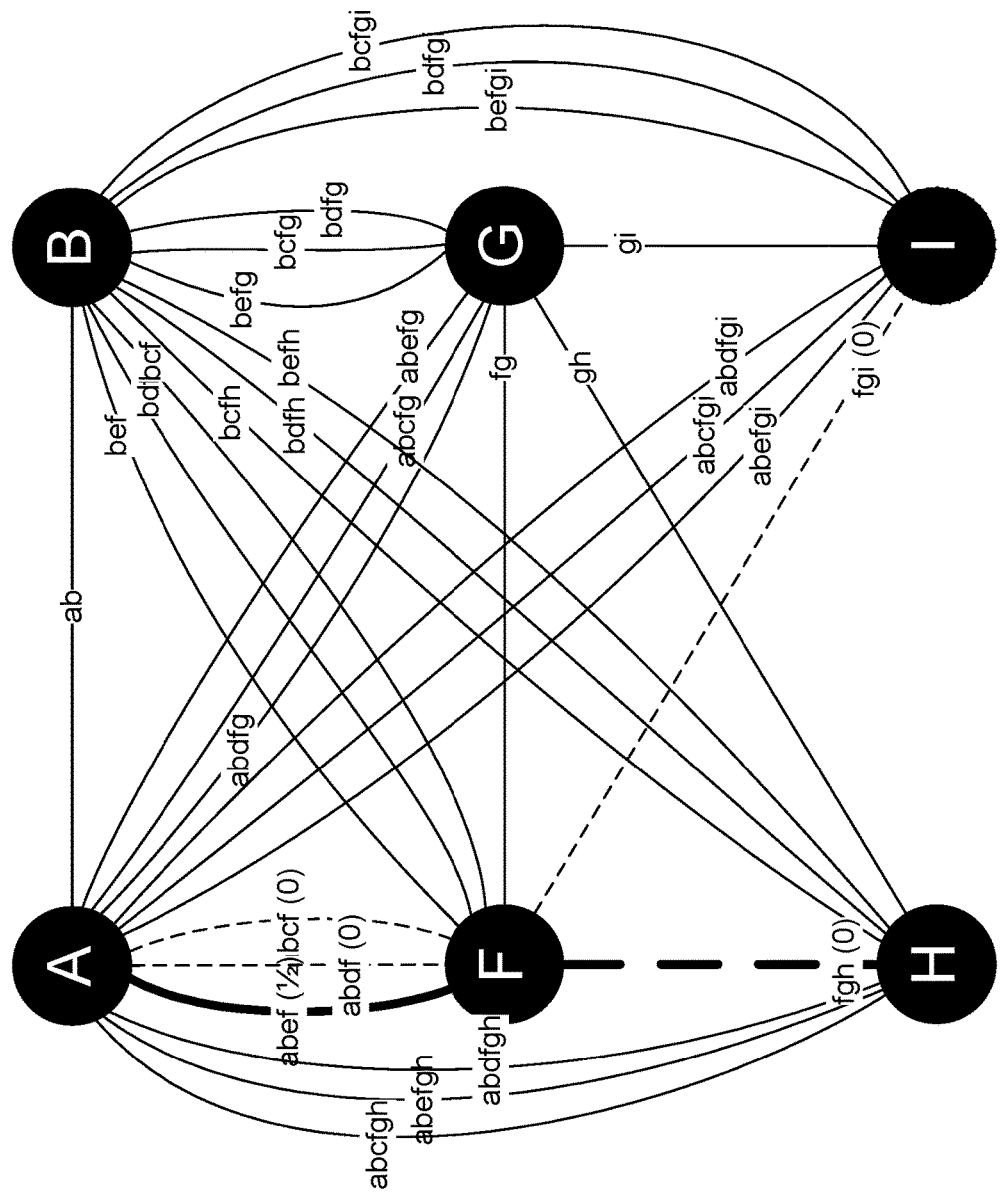

FIG. 9E depicts selection of a path on the auxiliary graph 800 corresponding to path 560 on network graph 500. Consistent with disclosed embodiments, a path on the auxiliary graph from stopping point A to stopping point F to stopping point H has the lowest weight (e.g., ½) among all paths on the auxiliary graph 800 for all remaining paths on the network graph (as the weight for edge fgh has been updated to zero). Therefore, this path is selected. The weight of edge abef is updated to zero.

Figure 9F:
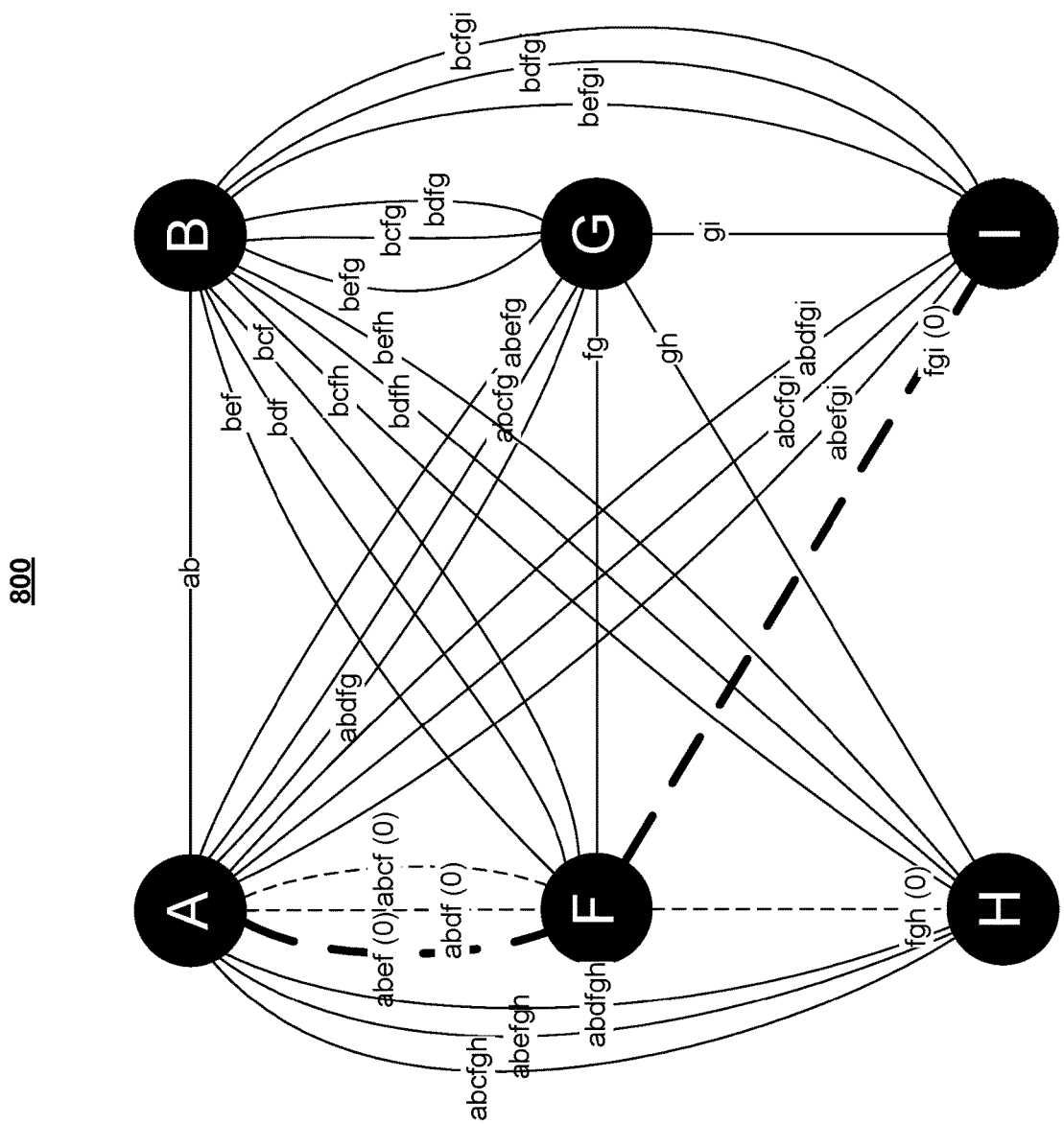

FIG. 9F depicts selection of a path on the auxiliary graph 800 corresponding to path 550 on network graph 500. Consistent with disclosed embodiments, a path on the auxiliary graph from stopping point A to stopping point F to stopping point I has the lowest weight (e.g., 0) among all paths on the auxiliary graph 800 for all remaining paths on the network graph (as the weight for edges abef and fgi have been updated to zero). Therefore, this path is selected. No weights need be updated.

Figure 9G:
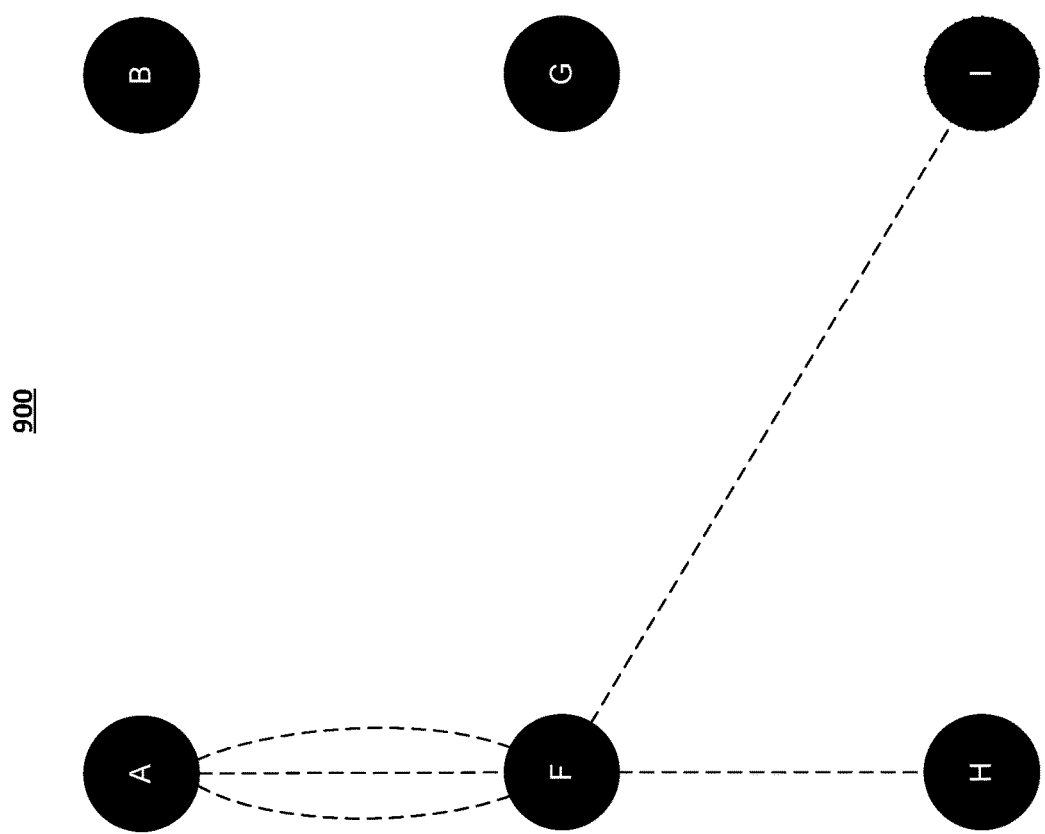

FIG. 9G depicts the final path set 900 selected using this method. This final path set includes only five relevant paths (e.g., {(a, b, e, f), (a, b, c, f), (a, b, d, f), (f, g, i), (f, g, h)}), one fewer than the original number of paths and two fewer than the number of paths in the set of irreducible paths. In this example, selecting paths using the auxiliary graph enabled satisfaction of the demands on the communications networks using fewer than the original number of routes. As routes typically require physical or software resources to implement, the demands on the communication network could therefore be satisfied using fewer resources. Alternatively, the communication network could use the same amount of resources (e.g., routes) to satisfy additional demands.

FIG. 10 depicts an exemplary method 1000 for updating routes in a communication network, consistent with disclosed embodiments. Method 1000 can be performed by a network management system (e.g., network management system 150, or the like). The communication network (e.g., service network 160, or the like) can include network devices (e.g., such as nodes 120, or the like) connected by links. A route can connect two network devices through one or more links and zero or more additional network devices. Method 1000 can include obtaining an original set of paths and generating an updated set of paths. The network management system 150 can provide instructions to the communications network to implement a set of routes corresponding to the updated set of paths.

Consistent with disclosed embodiments, method 1000 can include generating a set of irreducible paths corresponding to the original set of paths. Method 1000 can include generating the updated set of paths by selecting original paths or irreducible paths for inclusion in the updated set of paths. This selection can be performed at a subset level: a subset of the original set of paths can be selected or a corresponding subset of the set of irreducible paths can be selected. The subsets can be identified using a bipartite graph having vertices corresponding to the original set of paths and vertices corresponding to the set of irreducible paths. The subsets be associated with weights, and the selection of subsets for inclusion in the updated set of paths can depend on these weights. In some embodiments, the weights can indicate or correspond to the physical or software resources required to implement routes on the communications network corresponding to the paths.

In step 1010, the network management system 150 can obtain network paths on a network graph, consistent with disclosed embodiments. The network graph can represent a communications network and the network paths can represent routes on the communication network. As described herein, in some embodiments, the network management system 150 can create network graph or the network paths using information received from the communications network (or another system). In some embodiments, the network paths can satisfy a set of demands. The network management system 150 can obtain the demands and the network graph and then determined the network paths. In various embodiments, the network management system can receive or retrieve the network graph or network paths from the communications network (or another system).

In step 1020, the network management system 150 can generate irreducible paths on the network graph based on the network paths, consistent with disclosed embodiments. The network management system 150 can generate the set of irreducible paths as described with regards to FIG. 3A.

In step 1030, the network management system 150 can generate a bipartite graph, consistent with disclosed embodiments. As described with regards to FIG. 4A, the bipartite graph can include original path vertices corresponding to the network paths and irreducible path vertices corresponding to the irreducible paths. The bipartite graph can include edges connecting original path vertices and irreducible path vertices.

In step 1040, the network management system 150 can select a subset of the network paths and a subset of the irreducible paths, consistent with disclosed embodiments. As described with regards to FIG. 4B, the network management system 150 can select a connected component of the bipartite graph generated in step 1030. The connected component can include a subset of the original path vertices and a subset of the irreducible path vertices. Consistent with disclosed embodiments, the subset of the network paths can correspond to the subset of the original path vertices. The subset of the irreducible paths can then correspond to the subset of the irreducible path vertices. As may be appreciated, a subset can include the entire set. For example, when the bipartite network includes only a single connected component (e.g., as in FIG. 4A), the network management system 150 can select the entire set of network paths and the entire set of irreducible paths.

In step 1050, the network management system 150 can determine a graph weight for the subset of the network paths and an irreducible weight for the subset of the irreducible paths. In some embodiments, the graph weight for the subset can depend on a weight for each of the network paths in the subset. For example, the graph weight can be the sum of the weights of the network paths in the subset. Similarly, the irreducible weight can depend on a weight for each of the irreducible paths in the subset.

As described herein, a network path or irreducible path can include edges and vertices of the network graph. In some embodiments, the weight for a network path or irreducible path can be a function of at least one of the edges or vertices included in the path. For example, the edges included in the path can be associated with edge weights (which may differ). The weight for the path can be or include the sum of such edge weights. As an additional example, the vertices included in the path can be associated with vertex weights (which may differ). The weight for the path can be or include the sum of such vertex weights. In some embodiments, only the weights for the endpoint vertices contribute to the weights for a path. For example, only the weights for the endpoint vertices {a, i} may contribute to the weight for the path (a, b, c, f, g, i).

Consistent with disclosed embodiments, the weight for a network path or irreducible path can depend on inclusion of another network path in the updated set of paths. For example, when a network path or irreducible path having vertices (a, f) has been included in the set of paths, any weight for vertices a or f may be reduced or zeroed out when determining the weight of subsequent network paths or irreducible paths. In this manner, once a vertex is used as an endpoint, the resources required to use that vertex are not double counted when selecting additional paths for inclusion in the set of paths.

In step 1060, the network management device can compare the graph weight and the irreducible weight.

In step 1070, the network management device can include either the subset of the network paths or the subset of the irreducible paths in an updated set of paths. The selection of the subset of the network graphs or the subset of the irreducible graphs can depend on the comparison performed in step 1060. When the graph weight is lower than the irreducible weight, the network management device can include the subset of the network paths in the updated set of paths. Alternatively, the updated set of paths can be initialized to the network paths. In such embodiments, including the subset of the network paths in the updated set of paths can amount to not replacing the subset of the network paths with the subset of the irreducible paths. When the irreducible weight is lower than the graph weight, the network management device can include the subset of the irreducible paths in the updated set of paths. Alternatively, the updated set of paths can be initialized to the irreducible paths. In such embodiments, including the subset of the irreducible paths in the updated set of paths can amount to not replacing the subset of the irreducible paths with the subset of the network paths.

Consistent with disclosed embodiments, when additional connected components remain in the bipartite graph, the network management system 150 can return to step 1040 upon completion of step 1070. The network management system 150 can then select one of the additional connected components. This additional connected component will be associated with a subset of the network paths (e.g., a third subset of the network paths) and a corresponding subset of the irreducible paths (e.g., a fourth subset of the irreducible paths). The network management system 150 can then perform steps 1040 to 1060 using the third subset and forth subsets. As described herein, any weights for vertices can be affected (e.g., reduced or zeroed out) when paths including those vertices have previously been included in the updated set of paths.

Consistent with disclosed embodiments, when no additional connected components remain in the bipartite graph, method 1000 can terminate. The network management system 150 can provide instructions to the communications network to update the routes in the communications network to implement the paths in the updated set of paths.

Figure 11:
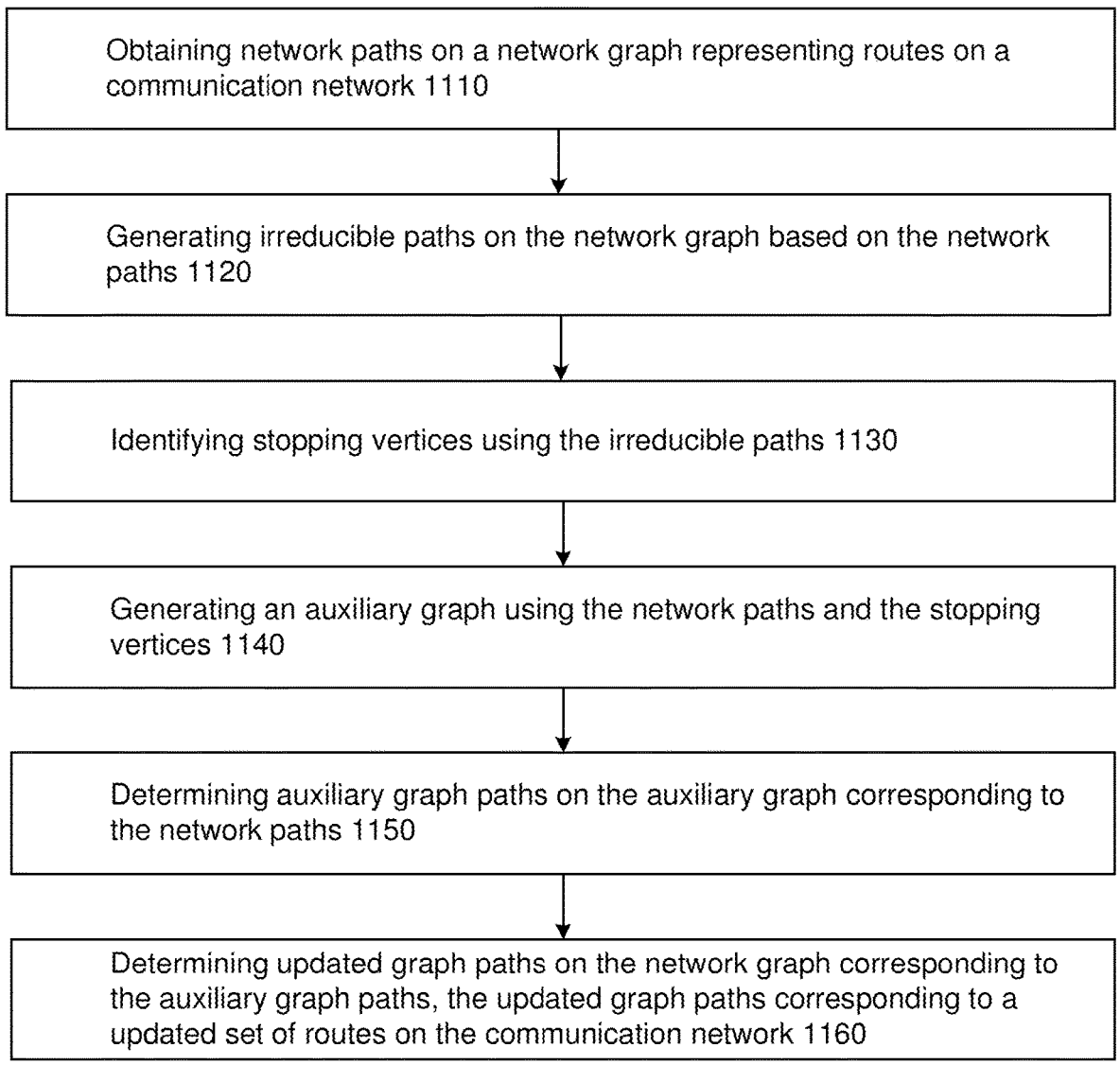
FIG. 11 depicts an exemplary method of generating an updated set of routes on a communication network, consistent with disclosed embodiments.

FIG. 11 depicts an exemplary method 1100 of generating an updated set of routes on a communication network. Method 1100 can be performed by a network management system (e.g., network management system 150 or the like). The communication network (e.g., service network 160, or the like) can include network devices (e.g., such as nodes 120, or the like) connected by links. A route can connect two network devices through one or more links and zero or more additional network devices. Method 1100 can include obtaining an original set of paths and generating an updated set of paths. The network management system 150 can provide instructions to the communications network to implement a set of routes corresponding to the updated set of paths.

Consistent with disclosed embodiments, method 1100 can include generating a set of irreducible paths corresponding to the original set of paths. Method 1100 can further include generating an auxiliary graph using the set of irreducible paths. The auxiliary graph can be used to select relevant sub-paths for inclusion in the updated set of paths. The relevant sub-paths can be selected using heuristically, using integer linear programming (ILP), or another suitable method. The edges of the auxiliary graph can be associated with weights and the relevant sub-paths can be selected based on these weights. In some embodiments, the weights can indicate or correspond to the physical or software resources required to implement routes on the communications network corresponding to the paths.

In step 1110, the network management system 150 can obtain network paths on a network graph, in accordance with disclosed embodiments. The network graph can represent a communications network and the network paths can represent routes on that communications network. Similar to step 1010 of method 1000, the network management system 150 can create network graph or the network paths (e.g. using information received or retrieved from the communications network or another system), or retrieve or receive the network graph or network paths from the communications network or another system.

In step 1120, the network management system 150 can generate irreducible paths on the network graph based on the network paths, consistent with disclosed embodiments. The network management system can generate the set of irreducible paths as described with regards to FIG. 3A.

In step 1130, the network management system 150 can identify stopping vertices on the network graph using the irreducible paths, consistent with disclosed embodiments. As described with regards to FIGS. 6A and 6B, the network management system 150 can select as the stopping vertices the endpoints of the irreducible paths.

In step 1140, the network management system 150 can generate an auxiliary graph using the network paths and the stopping vertices. As described with regards to FIGS. 7A to 7D, the auxiliary graph can include vertices corresponding to stopping points and edges corresponding to relevant sub-paths between edges. The auxiliary graph can be a multi-graph, with multiple edges connecting vertices. In some embodiments, weights can be associated with the vertices and/or edges. In some embodiments, an edge that corresponds to a sub-path can be initialized to a weight that depend on the number of paths including that sub-path. For example, the weight associated with that edge can be the reciprocal of the number of paths including that sub-path. In some embodiments, all edges can be initialized to the same weight.

In some embodiments, the auxiliary graph can be generated by constructing a sub-auxiliary graph for each of the network paths and combining the sub-auxiliary graphs. In various embodiments, the auxiliary graph can be constructed by determining edges connecting each pair of vertices on the auxiliary graph. Each selected pair of vertices can correspond to a pair of stopping points on the network graph. For each network path, if a relevant sub-path includes that network path and connects the pair of stopping points then an edge is created on the auxiliary graph that connects the selected vertices of the auxiliary graph and corresponds to the relevant sub-path.

In step 1150, the network management system 150 can determine auxiliary graph paths on the auxiliary graph. Each auxiliary graph path can correspond to one of the network paths obtained in step 1110.

In some embodiments, a MEDP method can be used to generate the graph paths, as described above with regards to FIGS. 9A to 9G. The MEDP method can include operations of determining candidate auxiliary graph path(s), selecting a candidate auxiliary graph path, and updating weights associated with the auxiliary graph based on the selection of the candidate auxiliary graph path.

Consistent with disclosed embodiments, candidate minimum-weight auxiliary graph path(s) can be determined. An auxiliary graph path can have a weight dependent on the auxiliary edges and/or vertices included in the auxiliary graph path. In some embodiments, each auxiliary edge can have an edge weight and/or each auxiliary vertex can have a vertex weight. The weight associated with an auxiliary graph path can depend on these weights. For example, the weight associated with an auxiliary graph path can be the sum of the edge weights associated with the auxiliary graph edges included in the auxiliary graph path. As an additional example, the weight associated with an auxiliary graph path can be the sum of the vertex weights associated with the auxiliary graph vertices included in the auxiliary graph path. The candidate minimum-weight auxiliary graph paths can be those graph path(s) having the minimum weight over all auxiliary graph paths for all remaining network paths.

Consistent with disclosed embodiments, a candidate minimum-weight auxiliary graph path can be selected. The disclosed embodiments are not limited to any particular method for selecting among candidate minimum-weight auxiliary graph paths. In some embodiments, the candidate minimum-weight auxiliary graph path can be randomly selected. In various embodiments, the candidate minimum-weight auxiliary graph paths can be selected based on secondary criteria. For example, the candidate minimum-weight auxiliary graph path including the largest number of auxiliary edges can be selected.

Consistent with disclosed embodiments, the edge weights and/or vertex weights associated with auxiliary graph edges and/or vertices included in the selected candidate minimum-weight auxiliary graph path can be updated. In some embodiments, these weights can be zeroed out. In various embodiments, these weights can be reduced. By reducing these weights, the MDEP method can encourage further selection of these edges and/or vertices (and thus the efficient use of the physical and/or software resources implementing the corresponding routes on the communications network).

In some embodiments, ILP can be used to find the auxiliary paths. The ILP problem can be formulated as the constrained minimization of the total cost of the vertices and edges included in the set of auxiliary paths found on the auxiliary graph. In some embodiments, an ILP solver can be used to determine a solution to the ILP problem.

In step 1160, the network management system 150 can determine updated graph paths on the network graph, in accordance with disclosed embodiments. The updated graph paths can correspond to the auxiliary graph paths selected in step 1150. As described herein, each auxiliary graph edge can correspond to a relevant sub-path on the network graph. The selected auxiliary graph paths can define a set of relevant sub-paths. The updated graph paths can be the union of the relevant sub-paths. The updated graph paths can correspond to an updated set of routes on the communication network.

The network management device can be configured to provide instructions to the communications network (e.g., to network devices of the communications network) to implement the updated set of routes.

Figure 12:
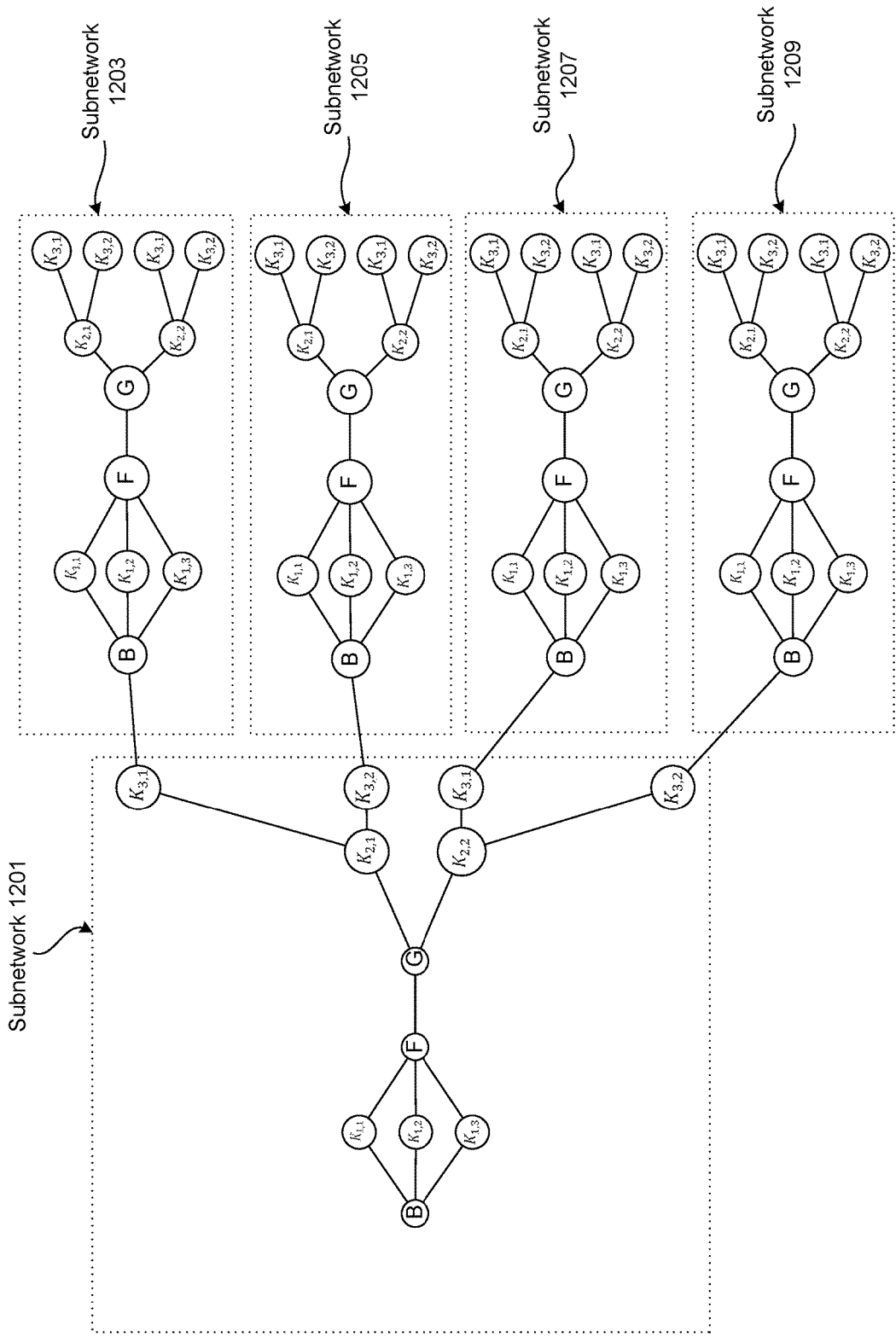
FIG. 12 depicts an instance of an exemplary family of nested network graphs and original network paths suitable for updating, consistent with disclosed embodiments.

The disclosed embodiments are suitable for determining more efficient routes in complicated communications networks, such as the nested network graph depicted in FIG. 12. In general, the family of nested networks disclosed in FIG. 12 can include subnetworks.

Each subnetwork includes $K_1=3$ connections between nodes B and F (e.g., through each of nodes $K_{1,1}$ to $K_{1,3}$). Each network includes $K_2=2$ choices following node G (e.g., through either of nodes $K_{2,1}$ and $K_{2,2}$) and $K_3=2$ choices following that choice (e.g., either of nodes $K_{3,1}$ and $K_{3,2}$). The nested network includes/layers. For i=1 to l each layer includes $(k_2 \cdot k_3)^{i-1}$ subnetworks. For example, network 1200 includes two layers. The first layer includes $(2 \cdot 2)^0=1$ subnetworks (e.g., subnetwork 1201). The second layer includes $(2 \cdot 2)^1=4$ subnetworks (e.g., subnetworks 1203 to 1209).

Each subnetwork can include an entry vertex (e.g., vertex B), a second vertex (e.g., vertex F), a third vertex (e.g., vertex G), a fourth vertex set including $k_1$ fourth vertices (e.g., vertices $K_{2,1}$ to $K_{2,2}$), and a fifth vertex set including $k_2$ subsets of $k_3$ fifth vertices (e.g., each subset including vertices $K_{3,1}$ to $K_{3,2}$), each vertex in the fifth vertex set for each block in the layer being connected to the entry vertex in a subnetwork in the subsequent layer. For each subnetwork, $k_1$ sequences connect the entry vertex and the second vertex. Each sequence can include one or more edges and zero or more vertices. In the example depicted in FIG. 12, each sequence includes a single vertex and two edges. For each subnetwork, a single edge connects the second vertex and third vertex, the third vertex is connected by a single edge to each of the $k_2$ fourth vertices, and each of the $k_2$ fourth vertices is associated with one subset of the $k_2$ subsets, each of the $k_3$ fifth vertices in the one subset being connected to the associated fourth vertex.

In this example, there are network paths from the entry vertex in subnetwork 1201 to each of the fifth vertices in the second-layer subnetworks. Each vertex in each subnetwork of network 1200 is included in at least one of the paths and no two network paths are the same. Accordingly, there are $(k_1 \cdot k_2 \cdot k_3)^l$ network paths.

Consistent with disclosed embodiments, a network management system can be configured to determine a set of irreducible paths for such a network based on the $(k_1 \cdot k_2 \cdot k_3)^l$ network paths. The set of irreducible paths can be generated as shown in FIG. 3A. In this example, there are $k_2$ irreducible paths between vertex G and the fourth vertices. There are $k_2 \cdot k_3$ irreducible nodes between the fourth vertices and the fifth vertices. There are $k_1$ irreducible paths between the first and second vertices. And a single irreducible path between the second and third vertices. Accordingly, for each subnetwork, there are $(k_1+1+k_2 \cdot (k_3+1))$ irreducible paths. There are $(k_2 \cdot k_3)^{i-1}$ subnetworks in a layer. Summed up over layers, there are $\Sigma_{i=1,\ldots,l}(k_2 \cdot k_3)^{i-1} \cdot (k_1+1+k_2 \cdot (k_3+1))$ irreducible paths. Depending on the values of $k_1$, $k_2$, $k_3$, and l, the size of the set of irreducible paths can be smaller than the size of the set of original paths. Consistent with disclosed embodiments, the network management system can then select the set of irreducible paths as the updated set of paths.

In some embodiments, the network management system can be configured to use the set of irreducible paths to generate an auxiliary graph, as described with regards to FIGS. 7A to 7D. An MDEP method (e.g., as described in FIGS. 8 to 9G) or ILP can be used to determine a set of relevant sub-paths over the network. The set of relevant sub-paths can include $k_1$ relevant sub-paths between the first and third vertices and $k_2 \cdot k_3$ relevant subpaths between the third vertex and fifth vertices. Thus each subnetwork can include $(k_1+k_2 \cdot k_3)$ relevant subpaths. There are $(k_2 \cdot k_3)^{i-1}$ subnetworks in a layer. Summed up over layers, there are $\Sigma_{i=1,\ldots,l}(k_2 \cdot k_3)^{i-1} \cdot (k_1+k_2 \cdot k_3)$ relevant subpaths. The size of the set of relevant subpaths paths can be smaller than the size of the set of original paths. Consistent with disclosed embodiments, the network management system can then select the set of relevant subpaths paths as the updated set of paths.

In exemplary embodiments, a non-transitory computer-readable storage medium including instructions is also provided, and the instructions may be executed by a device (such as a computer), for performing the above-described methods. For example, the non-transitory computer-readable storage medium may be a read-only memory (ROM), a Random-Access Memory (RAM), an electrically erasable programmable read-only memory (EEPROM), Programmable Array Logic (PAL), a disk, an optical disc, a Digital Versatile Disc (DVD), and so on.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. A method for generating an updated set of routes on a communication network, comprising:
   obtaining network paths on a network graph corresponding to the communication network, each network path representing a route on the communication network;

generating irreducible paths on the network graph based on the network paths;

identifying stopping vertices using the irreducible paths;

generating an auxiliary graph, wherein vertices of the auxiliary graph correspond to the stopping vertices and auxiliary graph edges of the auxiliary graph correspond to sub-paths connecting the stopping vertices on the network graph;

determining auxiliary graph paths on the auxiliary graph, each of the network paths corresponding to one of the auxiliary graph paths; and determining updated network paths on the network graph, each of the updated network paths corresponding to an auxiliary graph edge included in one of the auxiliary graph paths, the updated graph paths corresponding to the updated set of routes on the communication network.

2. The method of claim 1, wherein:

generating the irreducible paths comprises:
identifying a first path of the network paths and a second path of the network paths, wherein the first path comprises a common path, and the second path comprise a concatenation of a differing path and the common path; and
including in a set of paths the common path and the differing path.

3. The method of claim 1, wherein:
the stopping vertices comprise endpoints of the irreducible paths.

4. The method of claim 1, wherein:
generating the auxiliary graph comprises:
generating a sub-auxiliary graph for each one of the network paths; and
combining the sub-auxiliary graphs.

5. The method of claim 4, wherein:
each vertex of the sub-auxiliary graph corresponds to one of the stopping vertices; and
each edge of the sub-auxiliary graph:
corresponds to a sub-path between two stopping vertices, the sub-path on the one of the network paths; and
connects two vertices of the sub-auxiliary graph that correspond to the two stopping vertices.

6. The method of claim 1, wherein:
generating the auxiliary graph comprises:
creating, for a pair of stopping vertices connected by a sub-path of one of the network paths, an edge connecting two auxiliary graph vertices, the two auxiliary graph vertices corresponding to the pair of stopping vertices.

7. The method of claim 1, wherein:
determining the auxiliary graph paths on the auxiliary graph comprises:
determining candidate minimum-weight auxiliary graph paths based in part on edge weights associated with the auxiliary graph edges;
selecting one of the candidate minimum-weight auxiliary graph paths as one of the auxiliary graph paths; and
updating the edge weights associated with auxiliary graph edges included in the selected one of the candidate minimum-weight auxiliary graph paths.

8. The method of claim 7, wherein:
the candidate minimum-weight auxiliary graph paths are determined based in part on vertex weights associated with the auxiliary graph vertices; and determining the auxiliary graph paths on the auxiliary graph further comprises:
updating the vertex weights associated with auxiliary graph vertices included in the selected one of the candidate minimum-weight auxiliary graph paths.

9. The method of claim 1, wherein:
the auxiliary graph paths are determined using integer linear programming.

10. A system, comprising:
at least one processor; and
at least one non-transitory, computer-readable medium containing instructions that, when executed by the at least one processor, cause the system to perform operations for generating an updated set of routes on a communication network, the operations comprising:
obtaining network paths on a network graph corresponding to the communication network, each network path representing a route on the communication network;
generating irreducible paths on the network graph based on the network paths;
identifying stopping vertices using the irreducible paths;
generating an auxiliary graph, wherein vertices of the auxiliary graph correspond to the stopping vertices, and auxiliary graph edges of the auxiliary graph correspond to sub-paths connecting the stopping vertices on the network graph;
determining auxiliary graph paths on the auxiliary graph, each of the network paths corresponding to one of the auxiliary graph paths; and
determining updated network paths on the network graph, each of the updated network paths corresponding to an auxiliary graph edge included in one of the auxiliary graph paths, the updated graph paths corresponding to the updated set of routes on the communication network.

11. The system of claim 10, wherein:
generating the irreducible paths comprises:
identifying a first path of the network paths and a second path of the network paths, wherein the first path comprises a common path, and the second path comprises a concatenation of a differing path and the common path; and
including in a set of paths the common path and the differing path.

12. The system of claim 10, wherein:
the stopping vertices comprise endpoints of the irreducible paths.

13. The system of claim 10, wherein:
generating the auxiliary graph comprises:
generating a sub-auxiliary graph for each one of the network paths; and
combining the sub-auxiliary graphs.

14. The system of claim 13, wherein:
each vertex of the sub-auxiliary graph corresponds to one of the stopping vertices; and
each edge of the sub-auxiliary graph:
corresponds to a sub-path between two stopping vertices, the sub-path on the one of the network paths; and
connects two vertices of the sub-auxiliary graph that correspond to the two stopping vertices.

15. The system of claim 10, wherein:
generating the auxiliary graph comprises:
creating, for a pair of stopping vertices connected by a sub-path of one of the network paths, an edge connecting two auxiliary graph vertices, the two auxiliary graph vertices corresponding to the pair of stopping vertices.

16. The system of claim 10, wherein:
determining the auxiliary graph paths on the auxiliary graph comprises:
determining candidate minimum-weight auxiliary graph paths based in part on edge weights associated with the auxiliary graph edges;
selecting one of the candidate minimum-weight auxiliary graph paths as one of the auxiliary graph paths; and
updating the edge weights associated with auxiliary graph edges included in the selected one of the candidate minimum-weight auxiliary graph paths.

17. The system of claim 16, wherein:
the candidate minimum-weight auxiliary graph paths are determined based in part on vertex weights associated with the auxiliary graph vertices; and
determining the auxiliary graph paths on the auxiliary graph further comprises:
updating the vertex weights associated with auxiliary graph vertices included in the selected one of the candidate minimum-weight auxiliary graph paths.

18. The system of claim 10, wherein:
the auxiliary graph paths are determined using integer linear programming.

19. A non-transitory, computer-readable medium containing instructions that, when executed by at least one processor of a system, cause the system to perform operations for generating an updated set of routes on a communication network, the operations comprising:
obtaining network paths on a network graph corresponding to the communication network, each network path representing a route on the communication network;
generating irreducible paths on the network graph based on the network paths;
identifying stopping vertices using the irreducible paths;
generating an auxiliary graph, wherein vertices of the auxiliary graph correspond to the stopping vertices, and auxiliary graph edges of the auxiliary graph correspond to sub-paths connecting the stopping vertices on the network graph;
determining auxiliary graph paths on the auxiliary graph, each of the network paths corresponding to one of the auxiliary graph paths; and
determining updated network paths on the network graph, each of the updated network paths corresponding to an auxiliary graph edge included in one of the auxiliary graph paths, the updated graph paths corresponding to the updated set of routes on the communication network.

20. The non-transitory, computer-readable medium of claim 19, wherein:
the stopping vertices comprise endpoints of the irreducible paths; and
generating the irreducible paths comprises:
identifying a first path of the network paths and a second path of the network paths, wherein the first path comprises a common path, and the second path comprises a concatenation of a differing path and the common path; and
including in a set of paths the common path and the differing path.

21. The non-transitory, computer-readable medium of claim 19, wherein:
generating the auxiliary graph comprises:
generating a sub-auxiliary graph for each one of the network paths, each vertex of the sub-auxiliary graph corresponding to one of the stopping vertices, and each edge of the sub-auxiliary graph:
corresponding to a sub-path between two stopping vertices, the sub-path on the one of the network paths; and
connecting two vertices of the sub-auxiliary graph that correspond to the two stopping vertices; and
combining the sub-auxiliary graphs.

22. The non-transitory, computer-readable medium of claim 19, wherein:
generating the auxiliary graph comprises:
creating, for a pair of stopping vertices connected by a sub-path of one of the network paths, an edge connecting two auxiliary graph vertices, the two auxiliary graph vertices corresponding to the pair of stopping vertices.

23. The non-transitory, computer-readable medium of claim 19, wherein:
determining the auxiliary graph paths on the auxiliary graph comprises:
determining candidate minimum-weight auxiliary graph paths based in part on edge weights associated with the auxiliary graph edges, the candidate minimum-weight auxiliary graph paths being determined based in part on vertex weights associated with the auxiliary graph vertices;
selecting one of the candidate minimum-weight auxiliary graph paths as one of the auxiliary graph paths;
updating the edge weights associated with auxiliary graph edges included in the selected one of the candidate minimum-weight auxiliary graph paths; and
updating the vertex weights associated with auxiliary graph vertices included in the selected one of the candidate minimum-weight auxiliary graph paths.

* * * * *